United States Patent
Gao et al.

(10) Patent No.: US 10,686,524 B2
(45) Date of Patent: Jun. 16, 2020

(54) DISCOVERY AND REGISTRATION IN MULTI-CHANNEL PASSIVE OPTICAL NETWORKS (PONS)

(71) Applicant: Futurewei Technologies, Inc., Plano, TX (US)

(72) Inventors: Bo Gao, Wuhan (CN); Duane Remein, Raleigh, NC (US); Frank Effenberger, Frisco, TX (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/960,758

(22) Filed: Apr. 24, 2018

(65) Prior Publication Data

US 2018/0316436 A1 Nov. 1, 2018

Related U.S. Application Data

(60) Provisional application No. 62/491,661, filed on Apr. 28, 2017.

(51) Int. Cl.
| | | |
|---|---|---|
| H04B 10/66 | (2013.01) | |
| H04B 10/27 | (2013.01) | |
| H04L 12/24 | (2006.01) | |

(52) U.S. Cl.
CPC ............ *H04B 10/27* (2013.01); *H04B 10/66* (2013.01); *H04L 41/0853* (2013.01); *H04L 41/12* (2013.01)

(58) Field of Classification Search
CPC combination set(s) only.
See application file for complete search history.

(56) References Cited

U.S. PATENT DOCUMENTS

2002/0141405 A1* 10/2002 Bouet ............... H04L 29/06
370/389
2007/0133800 A1 6/2007 Kim et al.
(Continued)

FOREIGN PATENT DOCUMENTS

| CN | 102017522 A | 4/2011 |
| CN | 102045610 A | 5/2011 |

(Continued)

OTHER PUBLICATIONS

Machine Translation and Abstract of Chinese Publication No. CN102045610, May 4, 2011, 21 pages.
(Continued)

Primary Examiner — Omar S Ismail
(74) Attorney, Agent, or Firm — Conley Rose, P.C.

(57) ABSTRACT

An ONU comprises: a receiver configured to receive a discovery gate message from an OLT, the discovery gate message comprises a channel assignment field, and a discovery information field, the channel assignment field indicates transmission characteristics for a plurality of channels, and the discovery information field indicates a 25G upstream capability and a 25G discovery window; and a processor coupled to the receiver and configured to process the discovery gate message. A method implemented in an ONU, the method comprises: generating a register request message, the register request message comprises a destination address field, a source address field, a length/type field, an opcode field, and a discovery information field, and the discovery information field indicates a 25G upstream capability and a 25G registration attempt; and transmitting the register request message to an OLT.

20 Claims, 31 Drawing Sheets

Register Message
(Non-Standard)
1900

| | Field | Octets |
|---|---|---|
| 1905 — | Destination Address | 6 |
| 1910 — | Source Address | 6 |
| 1915 — | Length/Type = 0x8808 | 2 |
| 1920 — | Opcode = 0x0015 | 2 |
| 1925 — | Timestamp | 4 |
| 1930 — | Assigned Port (PLID) | 2 |
| 1935 — | Flags | 1 |
| 1940 — | Sync Time | 2 |
| 1945 — | Echo Pending Grants | 1 |
| 1950 — | Target Laser On time | 1 |
| 1955 — | Target Laser Off Time | 1 |
| 1960 — | Default Channel Configuration | 1 |
| 1965 — | Pad/Reserved | 31 |
| 1970 — | FCS | 4 |

(56) References Cited

U.S. PATENT DOCUMENTS

| | | | |
|---|---|---|---|
| 2010/0239252 A1* | 9/2010 | Davis | H04L 12/2885 398/58 |
| 2011/0116803 A1 | 5/2011 | Sone et al. | |
| 2011/0142444 A1 | 6/2011 | Borges et al. | |
| 2013/0089328 A1* | 4/2013 | Davis | H04L 12/2885 398/58 |
| 2015/0050024 A1 | 2/2015 | Luo et al. | |
| 2015/0365192 A1* | 12/2015 | Kim | H04J 14/0256 398/66 |
| 2016/0234858 A1* | 8/2016 | Bao | H04W 72/12 |
| 2017/0064418 A1* | 3/2017 | Tao | H04B 10/27 |
| 2017/0294982 A1* | 10/2017 | Wu | H04J 14/0242 |
| 2018/0035183 A1* | 2/2018 | Kim | H04Q 11/0067 |

FOREIGN PATENT DOCUMENTS

| | | |
|---|---|---|
| CN | 105247807 A | 1/2016 |
| KR | 20170042256 A | 4/2017 |

OTHER PUBLICATIONS

Li, C., et al., "A Novel TWDM-PON Architecture with Control Channel," 12th International Conference on Optical Internet Proceedings, Nov. 10, 2014, 2 pages.

Hajduczenia, M., et al., "Discovery Process for Emerging 10 Gb/s EPONs," IEEE Communications Magazine, vol. 46, Issue 11, Nov. 25, 2008, 9 pages.

Foreign Communication From a Counterpart Application, PCT Application No. PCT/CN2018/084406, English Translation of International Search Report dated Aug. 1, 2018, 5 pages.

Foreign Communication From a Counterpart Application, PCT Application No. PCT/CN2018/084406, English Translation of Written Opinion dated Aug. 1, 2018, 6 pages.

"IEEE Standard for Ethernet," IEEE Computer Society, IEEE Std 802.3, Sep. 3, 2015, 628 pages.

"IEEE Standard for Ethernet, Section Two," Sep. 3, 2015, 761 pages.

"IEEE Standard for Ethernet, Section Three," Sep. 3, 2015, 346 pages.

"IEEE Standard for Ethernet, Section Four," Sep. 3, 2015, 748 pages.

"IEEE Standard for Ethernet, Section Five," Sep. 3, 2015, 835 pages.

"IEEE Standard for Ethernet, Section Six," Sep. 3, 2015, 699 pages.

"Draft Standard for Ethernet Amendment: Physical Layer Specifications and Management Parameters for 25 Gb/s, 50 Gb/s, and 100 Gb/s Passive Optical Networks," IEEE P802.3ca/D0.7, Jan. 28, 2018, 112 pages.

"IEEE Standard for Ethernet," IEEE Computer Society, IEEE Std 802.3, Mar. 2012, 634 pages.

"Part 3: Carrier Sense Multiple Access with Collision Detection (CSMA/CD) Access Method and Physical Layer Specifications, Amendment 1: Physical Layer Specifications and Management Parameters for 10 Gb/s Passive Optical Networks," IEEE Computer Society, IEEE Std 802.3av, 236 pages.

Kramer, G., et al., "A proposal to decouple connectivity from media access," Aug. 2016, 18 pages.

Kramer, G., "Dimensioning of Reassembly Buffers at the OLT," Mar. 2017, 10 pages.

"Draft Standard for Ethernet Amendment: Physical Layer Specifications and Management Parameters for 25 Gb/s, 50 Gb/s, and 100 Gb/s Passive Optical Networks," IEEE P802.3ca™/D0.3, Mar. 16, 2017, 76 pages.

Foreign Communication From a Counterpart Application, Chinese Application No. 201880010535.3, Chinese Office Action dated Jan. 17, 2020, 10 pages.

"IEEE Standard for Ethernet Section 5," IEEE Std 802.3-2015 (Revision of IEEE Std 8023-2012), IEEE Standard, XP055677619, Mar. 4, 2016, 74 pages.

\* cited by examiner

Discovery Gate Message
(Standard)
300

| | Field | Octets |
|---|---|---|
| 305 | Destination Address | 6 |
| 310 | Source Address | 6 |
| 315 | Length/Type = 0x8808 | 2 |
| 320 | Opcode = 0x0017 | 2 |
| 325 | Timestamp | 4 |
| 330 | Channel Assignment | 1 |
| 335 | Start Time | 4 |
| 340 | Discovery Grant Length (EQ) | 3 |
| 345 | Sync Time | 2 |
| 350 | Discovery Information | 2 |
| 355 | Pad | 28 |
| 360 | FCS | 4 |

Discovery Gate Message
(Non-Standard)
400

| | Field | Octets |
|---|---|---|
| 405 | Destination Address | 6 |
| 410 | Source Address | 6 |
| 415 | Length/Type = 0x8808 | 2 |
| 420 | Opcode = 0x0012 | 2 |
| 425 | Timestamp | 4 |
| 430 | Channel Assignment | 1 |
| 435 | Start Time | 4 |
| 440 | Granted LLID | 2 |
| 445 | Flags/Grant Length (EQ) | 3 |
| 450 | Sync Time | 2 |
| 455 | Discovery Information | 2 |
| 460 | Pad/Reserved | 26 |
| 465 | FCS | 4 |

Channel Assignment Field
(Standard)
500

| | Bit | Channel Field | Value |
|---|---|---|---|
| 505 | 0 | Upstream channel 0 | 0 – do not use upstream channel 0 for transmission<br>1 – use upstream channel 0 for transmission |
| 510 | 1 | Upstream channel 1 | 0 – do not use upstream channel 1 for transmission<br>1 – use upstream channel 1 for transmission |
| 515 | 2 | Upstream channel 2 | 0 – do not use upstream channel 2 for transmission<br>1 – use upstream channel 2 for transmission |
| 520 | 3 | Upstream channel 3 | 0 – do not use upstream channel 3 for transmission<br>1 – use upstream channel 3 for transmission |
| 525 | 4-7 | Reserved | Reserved |

FIG. 5

Channel Assignment Field
(Non-Standard)
600

| Bit | Field Name | Value |
|---|---|---|
| 605 — 0 | Ch0 Grant | 0 – The transmission opportunity does not apply to Channel 0<br>1 – The transmission opportunity does apply to Channel 0 |
| 610 — 1 | Ch1 Grant | 0 – The transmission opportunity does not apply to Channel 1<br>1 – The transmission opportunity does apply to Channel 1 |
| 615 — 2 | Ch2 Grant | 0 – The transmission opportunity does not apply to Channel 2<br>1 – The transmission opportunity does apply to Channel 2 |
| 620 — 3 | Ch3 Grant | 0 – The transmission opportunity does not apply to Channel 3<br>1 – The transmission opportunity does apply to Channel 3 |
| 625 — 4-7 | Reserved | Ignored on reception |

FIG. 6

Discovery Grant Length (EQ) Field
(Non-Standard)
700

| Bit | Field Name | Value |
|---|---|---|
| 0-20 | Grant Length | The transmission opportunity duration (in EQ) for the grant |
| 21 | Discovery Flag | 0 – Normal Gate<br>1 – Discovery Gate |
| 22 | Force Report | 0 – No action required<br>1 – A report frame should be issued for the granted LLID at the corresponding transmission opportunity |
| 23 | Fragment Flag | 0 – Creation of a new fragment is disallowed in this grant<br>1 – Fragmentation is allowed in this grant |

705 — (Grant Length row)
710 — (Discovery Flag row)
715 — (Force Report row)
720 — (Fragment Flag row)

FIG. 7

Discovery Information Field
(Standard)
800

| | Bit | Flag Field | Value |
|---|---|---|---|
| 805 | 0 | Reserved | Ignored on Reception |
| 810 | 1 | OLT is 10G upstream capable | 0 – OLT does not support 10 Gb/s reception<br>1 – OLT supports 10 Gb/s reception |
| 815 | 2 | OLT is 25G upstream capable | 0 – OLT does not support 25 Gb/s reception<br>1 – OLT supports 25 Gb/s reception |
| 820 | 3-4 | Reserved | Ignored on Reception |
| 825 | 5 | OLT is opening 10G discovery window | 0 – OLT cannot receive 10 Gb/s data in this window<br>1 – OLT can receive 10 Gb/s data in this window |
| 830 | 6 | OLT is opening 25G discovery window | 0 – OLT cannot receive 25 Gb/s data in this window<br>1 – OLT can receive 25 Gb/s data in this window |
| 835 | 7-15 | Reserved | Ignored on Reception |

FIG. 8

Discovery Information Field
(Non-Standard)
900

| Bit | Discovery Information Field | Value |
|---|---|---|
| 0 | OLT is 1G upstream capable | 0 – OLT does not support 1 Gb/s reception<br>1 – OLT supports 1 Gb/s reception |
| 1 | OLT is 10G upstream capable | 0 – OLT does not support 10 Gb/s reception<br>1 – OLT supports 10 Gb/s reception |
| 2-3 | OLT is 25/50/100G upstream capable | 00 – OLT does not support 25/50/100 Gb/s reception<br>01 – OLT supports 25 Gb/s reception (Channel 0)<br>10 – OLT supports 50 Gb/s reception (Channel 0, 1)<br>11 – OLT supports 100 Gb/s reception (Channel 0-3) |
| 4 | OLT is opening 1G discovery window | 0 – OLT cannot receive 1 Gb/s data in this window<br>1 – OLT can receive 1 Gb/s data in this window |
| 5 | OLT is opening 10G discovery window | 0 – OLT cannot receive 10 Gb/s data in this window<br>1 – OLT can receive 10 Gb/s data in this window |
| 6 | OLT is opening 25/50/100G Discovery Window | 0 – No 25/50/100G discovery window open<br>1 – OLT is opening 25/50/100G discovery window |
| 7 | Reserved | Ignore on Reception |
| 8 | US Channel Default Configuration Ch 0 | 0 – US Channel 0 is powered off by default<br>1 – US channel 0 is powered on by default |
| 9 | US Channel Default Configuration Ch 1 | 0 – US Channel 1 is powered off by default<br>1 – US channel 1 is powered on by default |
| 10 | US Channel Default Configuration Ch 2 | 0 – US Channel 2 is powered off by default<br>1 – US channel 2 is powered on by default |
| 11 | US Channel Default Configuration Ch 3 | 0 – US Channel 3 is powered off by default<br>1 – US channel 3 is powered on by default |
| 12 | DS Channel Default Configuration Ch 0 (optional) | 0 – DS Channel 0 is powered off by default<br>1 – DS channel 0 is powered on by default |
| 13 | DS Channel Default Configuration Ch 1 (optional) | 0 – DS Channel 1 is powered off by default<br>1 – DS channel 1 is powered on by default |
| 14 | DS Channel Default Configuration Ch 2 (optional) | 0 – DS Channel 2 is powered off by default<br>1 – DS channel 2 is powered on by default |
| 15 | DS Channel Default Configuration Ch 3 (optional) | 0 – DS Channel 3 is powered off by default<br>1 – DS channel 3 is powered on by default |

905 → row 0
910 → row 1
915 → row 2-3
920 → row 4
925 → row 5
930 → row 6
935 → row 7
940 → row 8
945 → row 9
950 → row 10
955 → row 11
960 → row 12
965 → row 13
970 → row 14
975 → row 15

FIG. 9

Discovery Information Field
(Non-Standard)
1000

| | Bit | Flag Field | Value |
|---|---|---|---|
| 1005 | 0 | OLT is 1G upstream capable | 0 – OLT does not support 1 Gb/s reception<br>1 – OLT supports 1 Gb/s reception |
| 1010 | 1 | OLT is 10G upstream capable | 0 – OLT does not support 10 Gb/s reception<br>1 – OLT supports 10 Gb/s reception |
| 1015 | 2-3 | OLT is 25/50/100G upstream capable | 00 – OLT does not support 25/50/100 Gb/s reception<br>01 – OLT supports 25 Gb/s reception (Channel 0)<br>10 – OLT supports 50 Gb/s reception (Channel 0, 1)<br>11 – OLT supports 100 Gb/s reception (Channel 0-3) |
| 1020 | 4 | OLT is opening 1G discovery window | 0 – OLT cannot receive 1 Gb/s data in this window<br>1 – OLT can receive 1 Gb/s data in this window |
| 1025 | 5 | OLT is opening 10G discovery window | 0 – OLT cannot receive 10 Gb/s data in this window<br>1 – OLT can receive 10 Gb/s data in this window |
| 1030 | 6-7 | OLT is opening 25/50/100G discovery window | 00 – OLT cannot receive 25/50/100G data<br>01 – OLT opening 25 Gb/s window channel 0<br>10 – OLT opening 50 Gb/s window channel 0 and 1<br>11 – OLT opening 100 Gb/s window channels 0-3 |
| 1035 | 8-15 | Reserved | Ignore on Reception |

FIG. 10

Discovery Information Field
(Non-Standard)
1100

| | Bit | Flag Field | Value |
|---|---|---|---|
| 1105 | 0 | OLT is 1G upstream capable | 0 – OLT does not support 1 Gb/s reception<br>1 – OLT supports 1 Gb/s reception |
| 1110 | 1 | OLT is 10G upstream capable | 0 – OLT does not support 10 Gb/s reception<br>1 – OLT supports 10 Gb/s reception |
| 1115 | 2-3 | Reserved | Ignored on Reception |
| 1120 | 4 | OLT is opening 1G discovery window | 0 – OLT cannot receive 1 Gb/s data in this window<br>1 – OLT can receive 1 Gb/s data in this window |
| 1125 | 5 | OLT is opening 10G discovery window | 0 – OLT cannot receive 10 Gb/s data in this window<br>1 – OLT can receive 10 Gb/s data in this window |
| 1130 | 6-7 | Reserved | Ignore on Reception |
| 1135 | 8 | OLT is 25G upstream capable | 0 – OLT does not support 25 Gb/s reception<br>1 – OLT supports 25 Gb/s reception |
| 1140 | 9 | OLT is 50G upstream capable | 0 – OLT does not support 50 Gb/s reception<br>1 – OLT supports 50 Gb/s reception |
| 1145 | 10 | OLT is 100G upstream capable | 0 – OLT does not support 100 Gb/s reception<br>1 – OLT supports 100 Gb/s reception |
| 1150 | 11 | Reserved | Ignore on Reception |
| 1155 | 12 | OLT is opening 25G discovery window | 0 – OLT cannot receive 25 Gb/s data in this window<br>1 – OLT can receive 25 Gb/s data in this window |
| 1160 | 13 | OLT is opening 50G discovery window | 0 – OLT cannot receive 50 Gb/s data in this window<br>1 – OLT can receive 50 Gb/s data in this window |
| 1165 | 14 | OLT is opening 100G discovery window | 0 – OLT cannot receive 100 Gb/s data in this window<br>1 – OLT can receive 100 Gb/s data in this window |
| 1170 | 15 | Reserved | Ignore on Reception |

FIG. 11

Register Request Message
(Standard)
1200

| | Field | Octets |
|---|---|---|
| 1205 | Destination Address | 6 |
| 1210 | Source Address | 6 |
| 1215 | Length/Type = 0x8808 | 2 |
| 1220 | Opcode = 0x0014 | 2 |
| 1225 | Timestamp | 4 |
| 1230 | Flags | 1 |
| 1235 | Pending Grants | 1 |
| 1240 | Discovery Information | 2 |
| 1245 | Laser On Time | 1 |
| 1250 | Laser Off Time | 1 |
| 1255 | Pad | 34 |
| 1260 | FCS | 4 |

Discovery Information Field
(Standard)
1300

| | Bit | Flag Field | Value |
|---|---|---|---|
| 1305 | 0 | ONU is 1G upstream capable | 0 – ONU transmitter is not capable of 1 Gb/s<br>1 – ONU transmitter is capable of 1 Gb/s |
| 1310 | 1 | ONU is 10G upstream capable | 0 – ONU transmitter is not capable of 10 Gb/s<br>1 – ONU transmitter is capable of 10 Gb/s |
| 1315 | 2 | ONU is 25G upstream capable | 0 – ONU transmitter is not capable of 25 Gb/s<br>1 – ONU transmitter is capable of 25 Gb/s |
| 1320 | 3 | Reserved | Ignored on Reception |
| 1325 | 4 | 1G registration attempt | 0 – 1 Gb/s registration is not attempted<br>1 – 1 Gb/s registration is attempted |
| 1330 | 5 | 10G registration attempt | 0 – 10 Gb/s registration is not attempted<br>1 – 10 Gb/s registration is attempted |
| 1335 | 6 | 25G registration attempt | 0 – 25 Gb/s registration is not attempted<br>1 – 25 Gb/s registration is attempted |
| 1340 | 7-15 | Reserved | Ignored on Reception |

FIG. 13

Discovery Information Field
(Non-Standard)
1400

| Bit | Flag Field | Value |
|---|---|---|
| 1405 — 0 | ONU is 1G upstream capable | 0 – ONU transmitter is not capable of 1 Gb/s<br>1 – ONU transmitter is capable of 1 Gb/s |
| 1410 — 1 | ONU is 10G upstream capable | 0 – ONU transmitter is not capable of 10 Gb/s<br>1 – ONU transmitter is capable of 10 Gb/s |
| 1415 — 2-3 | ONU is 25/50/100G upstream capable | 00 – ONU transmitter is not capable of 25/50/100 Gb/s<br>01 – ONU transmitter is capable of 25 Gb/s (channel 0)<br>10 – ONU transmitter is capable of 50 Gb/s (channel 0, 1)<br>11 – ONU transmitter is capable of 100 Gb/s (channel 0-3) |
| 1420 — 4 | 1G registration attempt | 0 – 1 Gb/s registration is not attempted<br>1 – 1 Gb/s registration is attempted |
| 1425 — 5 | 10G registration attempt | 0 – 10 Gb/s registration is not attempted<br>1 – 10 Gb/s registration is attempted |
| 1430 — 6-7 | 25/50/100G registration attempt | 00 – multi-channel registration is not attempted<br>01 – 25 Gb/s (channel 0) registration is attempted<br>10 – 50 Gb/s (channel 0, 1) registration is attempted<br>11 – 100 Gb/s (channel 0-3) registration is attempted |
| 1435 — 8-15 | Reserved | Ignored on Reception |

FIG. 14

Discovery Information Field
(Non-Standard)
1500

| | Bit | Flag Field | Value |
|---|---|---|---|
| 1505 | 0 | ONU is 1G upstream capable | 0 – ONU transmitter is not capable of 1 Gb/s<br>1 – ONU transmitter is capable of 1 Gb/s |
| 1510 | 1 | ONU is 10G upstream capable | 0 – ONU transmitter is not capable of 10 Gb/s<br>1 – ONU transmitter is capable of 10 Gb/s |
| 1515 | 2-3 | Reserved | Ignored on Reception |
| 1520 | 4 | 1G registration attempt | 0 – 1 Gb/s registration is not attempted<br>1 – 1 Gb/s registration is attempted |
| 1525 | 5 | 10G registration attempt | 0 – 10 Gb/s registration is not attempted<br>1 – 10 Gb/s registration is attempted |
| 1530 | 6-7 | Reserved | Ignored on Reception |
| 1535 | 8 | ONU is 25G upstream capable | 0 – ONU transmitter is not capable of 25 Gb/s<br>1 – ONU transmitter is capable of 25 Gb/s |
| 1540 | 9 | ONU is 50G upstream capable | 0 – ONU transmitter is not capable of 50 Gb/s<br>1 – ONU transmitter is capable of 50 Gb/s |
| 1545 | 10 | ONU is 100G upstream capable | 0 – ONU transmitter is not capable of 100 Gb/s<br>1 – ONU transmitter is capable of 100 Gb/s |
| 1550 | 11 | Reserved | Ignored on Reception |
| 1555 | 12 | 25G registration attempt | 0 – 25 Gb/s registration is not attempted<br>1 – 25 Gb/s registration is attempted |
| 1560 | 13 | 50G registration attempt | 0 – 50 Gb/s registration is not attempted<br>1 – 50 Gb/s registration is attempted |
| 1565 | 14 | 100G registration attempt | 0 – 100 Gb/s registration is not attempted<br>1 – 100 Gb/s registration is attempted |
| 1570 | 15 | Reserved | Ignored on Reception |

FIG. 15

Discovery Information Field
(Non-Standard)
1600

| Bit | Flag Field | Value |
|---|---|---|
| 0 | ONU is 1G upstream capable | 0 – ONU transmitter is not capable of 1 Gb/s<br>1 – ONU transmitter is capable of 1 Gb/s |
| 1 | ONU is 10G upstream capable | 0 – ONU transmitter is not capable of 10 Gb/s<br>1 – ONU transmitter is capable of 10 Gb/s |
| 2 | ONU is 25G upstream capable | 0 – ONU transmitter is not capable of 25 Gb/s<br>1 – ONU transmitter is capable of 25 Gb/s |
| 3 | ONU is multi-channel upstream capable | 0 – ONU transmitter is not capable of multi-channel<br>1 – ONU transmitter is capable of multi-channel |
| 4 | 1G registration attempt | 0 – 1 Gb/s registration is not attempted<br>1 – 1 Gb/s registration is attempted |
| 5 | 10G registration attempt | 0 – 10 Gb/s registration is not attempted<br>1 – 10 Gb/s registration is attempted |
| 6 | 25G registration attempt | 0 – 25 Gb/s registration is not attempted<br>1 – 25 Gb/s registration is attempted |
| 7 | Channel 1 registration attempt | 0 – Channel 1 registration is not attempted<br>1 – Channel 1 registration is attempted |
| 8 | Channel 2 registration attempt | 0 – Channel 2 registration is not attempted<br>1 – Channel 2 registration is attempted |
| 9 | Channel 3 registration attempt | 0 – Channel 3 registration is not attempted<br>1 – Channel 3 registration is attempted |
| 10 | ONU is Channel 1 upstream capable | 0 – ONU is not capable of US1 channel transmission<br>1 – ONU is capable of US1 channel transmission |
| 11 | ONU is Channel 2/3 upstream capable | 0 – ONU is not capable of US2/3 channel transmission<br>1 – ONU is capable of US2/3 channel transmission |
| 12 | Reserved | Ignored on Reception |
| 13 | ONU is Channel 0 downstream capable | 0 – ONU is not capable of DS0 channel transmission<br>1 – ONU is capable of DS0 channel transmission |
| 14 | ONU is Channel 1 downstream capable | 0 – ONU is not capable of DS1 channel transmission<br>1 – ONU is capable of DS1 channel transmission |
| 15 | ONU is Channel 2/3 downstream capable | 0 – ONU is not capable of DS2/3 channel transmission<br>1 – ONU is capable of DS2/3 channel transmission |

FIG. 16

Discovery Information Field
(Non-Standard)
1700

| Bit | Flag Field | Value |
|---|---|---|
| 0 | ONU is 1G upstream capable | 0 – ONU transmitter is not capable of 1 Gb/s<br>1 – ONU transmitter is capable of 1 Gb/s |
| 1 | ONU is 10G upstream capable | 0 – ONU transmitter is not capable of 10 Gb/s<br>1 – ONU transmitter is capable of 10 Gb/s |
| 2 | ONU is 25G upstream capable | 0 – ONU transmitter is not capable of 25 Gb/s<br>1 – ONU transmitter is capable of 25 Gb/s |
| 3 | ONU is multi-channel upstream capable | 0 – ONU transmitter is not capable of multi-channel<br>1 – ONU transmitter is capable of multi-channel |
| 4 | 1G registration attempt | 0 – 1 Gb/s registration is not attempted<br>1 – 1 Gb/s registration is attempted |
| 5 | 10G registration attempt | 0 – 10 Gb/s registration is not attempted<br>1 – 10 Gb/s registration is attempted |
| 6 | 25G registration attempt | 0 – 25 Gb/s registration is not attempted<br>1 – 25 Gb/s registration is attempted |
| 7 | Multi-channel registration attempt | 0 – Multi-channel registration is not attempted<br>1 – Multi-channel registration is attempted |
| 8 | Reserved | Ignored on Reception |
| 9 | ONU is Channel 1 downstream capable | 0 – ONU is not capable of DS1 channel transmission<br>1 – ONU is capable of DS1 channel transmission |
| 10 | ONU is Channel 2/3 downstream capable | 0 – ONU is not capable of DS2/3 channel transmission<br>1 – ONU is capable of DS2/3 channel transmission |
| 11-12 | Reserved | Ignored on Reception |
| 13 | ONU is Channel 1 upstream capable | 0 – ONU is not capable of US1 channel transmission<br>1 – ONU is capable of US1 channel transmission |
| 14 | ONU is Channel 2/3 upstream capable | 0 – ONU is not capable of US2/3 channel transmission<br>1 – ONU is capable of US2/3 channel transmission |
| 15 | Reserved | Ignored on Reception |

FIG. 17

Register Message
(Standard)
1800

| | Field | Octets |
|---|---|---|
| 1805 | Destination Address | 6 |
| 1810 | Source Address | 6 |
| 1815 | Length/Type = 0x8808 | 2 |
| 1820 | Opcode = 0x0015 | 2 |
| 1825 | Timestamp | 4 |
| 1830 | Assigned Port (PLID) | 2 |
| 1835 | Assigned Port (MLID) | 2 |
| 1840 | Flags | 1 |
| 1845 | Sync Time | 2 |
| 1850 | Echo Pending Grants | 1 |
| 1855 | Laser On Time | 1 |
| 1860 | Laser Off Time | 1 |
| 1865 | Pad | 30 |
| 1870 | FCS | 4 |

Register Message
(Non-Standard)
1900

| | Field | Octets |
|---|---|---|
| 1905 | Destination Address | 6 |
| 1910 | Source Address | 6 |
| 1915 | Length/Type = 0x8808 | 2 |
| 1920 | Opcode = 0x0015 | 2 |
| 1925 | Timestamp | 4 |
| 1930 | Assigned Port (PLID) | 2 |
| 1935 | Flags | 1 |
| 1940 | Sync Time | 2 |
| 1945 | Echo Pending Grants | 1 |
| 1950 | Target Laser On time | 1 |
| 1955 | Target Laser Off Time | 1 |
| 1960 | Default Channel Configuration | 1 |
| 1965 | Pad/Reserved | 31 |
| 1970 | FCS | 4 |

Default Channel Configuration Field
(Non-Standard)
2000

| Bit | Flag Field | Value |
|---|---|---|
| 0 | Downstream Channel 0 enable | 0 – Channel 0 downstream transmitter is disabled<br>1 – Channel 0 downstream transmitter is enabled |
| 1 | Downstream Channel 1 enable | 0 – Channel 1 downstream transmitter is disabled<br>1 – Channel 1 downstream transmitter is enabled |
| 2 | Downstream Channel 2 enable | 0 – Channel 2 downstream transmitter is disabled<br>1 – Channel 2 downstream transmitter is enabled |
| 3 | Downstream Channel 3 enable | 0 – Channel 3 downstream transmitter is disabled<br>1 – Channel 3 downstream transmitter is enabled |
| 4 | Upstream Channel 0 enable | 0 – Channel 0 upstream transmitter is disabled<br>1 – Channel 0 upstream transmitter is enabled |
| 5 | Upstream Channel 1 enable | 0 – Channel 1 upstream transmitter is disabled<br>1 – Channel 1 upstream transmitter is enabled |
| 6 | Upstream Channel 2 enable | 0 – Channel 2 upstream transmitter is disabled<br>1 – Channel 2 upstream transmitter is enabled |
| 7 | Upstream Channel 3 enable | 0 – Channel 3 upstream transmitter is disabled<br>1 – Channel 3 upstream transmitter is enabled |

FIG. 20

Register Acknowledgment Message
(Standard)
2100

| | Field | Octets |
|---|---|---|
| 2105 | Destination Address | 6 |
| 2110 | Source Address | 6 |
| 2115 | Length/Type = 0x8808 | 2 |
| 2120 | Opcode = 0x0016 | 2 |
| 2125 | Timestamp | 4 |
| 2130 | Flags | 1 |
| 2135 | Echo Assigned Port (PLID) | 2 |
| 2140 | Echo Assigned Port (MLID) | 2 |
| 2145 | Echo Sync Time | 2 |
| 2150 | Pad | 33 |
| 2155 | FCS | 4 |

Register Acknowledgment Message
(Non-Standard)
2200

| Field | Octets |
|---|---|
| Destination Address | 6 |
| Source Address | 6 |
| Length/Type = 0x8808 | 2 |
| Opcode = 0x0015 | 2 |
| Timestamp | 4 |
| Flags | 1 |
| Echo Assigned Port (PLID) | 2 |
| Echo Sync Time | 2 |
| Echo Default Channel Configuration | 1 |
| Pad/Reserved | 34 |
| FCS | 4 |

Gate Message (Standard) 2300

| | Field | Octets |
|---|---|---|
| 2303 | Destination Address | 6 |
| 2305 | Source Address | 6 |
| 2307 | Length/Type = 0x8808 | 2 |
| 2310 | Opcode = 0x0012 | 2 |
| 2313 | Timestamp | 4 |
| 2315 | Channel Assignment | 1 |
| 2317 | Grant Start Time | 4 |
| 2320 | LLID #1 | 0/2 |
| 2323 | Grant Length #1 | 0/3 |
| 2325 | LLID #2 | 0/2 |
| 2327 | Grant Length #2 | 0/3 |
| 2330 | LLID #3 | 0/2 |
| 2333 | Grant Length #3 | 0/3 |
| 2335 | LLID #4 | 0/2 |
| 2337 | Grant Length #4 | 0/3 |
| 2340 | LLID #5 | 0/2 |
| 2343 | Grant Length #5 | 0/3 |
| 2345 | LLID #6 | 0/2 |
| 2347 | Grant Length #6 | 0/3 |
| 2350 | LLID #7 | 0/2 |
| 2353 | Grant Length #7 | 0/3 |
| 2355 | Pad/Reserved | 0-30 |
| 2357 | FCS | 4 |

Gate Message
(Non-Standard)
2400

| | Field | Octets |
|---|---|---|
| 2403 | Destination Address | 6 |
| 2405 | Source Address | 6 |
| 2407 | Length/Type = 0x8808 | 2 |
| 2410 | Opcode = 0x0012 | 2 |
| 2413 | Timestamp | 4 |
| 2415 | Channel Assignment | 1 |
| 2417 | Start Time | 4 |
| 2420 | Granted LLID #1 | 2 |
| 2423 | Flags/Grant Length #1 (21 bits) | 3 |
| 2425 | Granted LLID #2 | 0/2 |
| 2427 | Flags/Grant Length #2 | 0/3 |
| 2430 | Granted LLID #3 | 0/2 |
| 2433 | Flags/Grant Length #3 | 0/3 |
| 2435 | Granted LLID #4 | 0/2 |
| 2437 | Flags/Grant Length #4 | 0/3 |
| 2440 | Granted LLID #5 | 0/2 |
| 2443 | Flags/Grant Length #5 | 0/3 |
| 2445 | Granted LLID #6 | 0/2 |
| 2447 | Flags/Grant Length #6 | 0/3 |
| 2450 | Granted LLID #7 | 0/2 |
| 2453 | Flags/Grant Length #7 | 0/3 |
| 2455 | Pad | 0-30 |
| 2457 | FCS | 4 |

FIG. 24

Report Message
(Standard)
2500

| Field | Octets |
|---|---|
| 2503 — Destination Address | 6 |
| 2505 — Source Address | 6 |
| 2507 — Length/Type = 0x8808 | 2 |
| 2510 — Opcode = 0x0013 | 2 |
| 2513 — Timestamp | 4 |
| 2515 — Number of Non-Empty Queues | 1 |
| 2517 — Report Time | 4 |
| 2520 — LLID #1 | 2 |
| 2523 — Queue Length #1 | 3 |
| 2525 — LLID #2 | 2 |
| 2527 — Queue Length #2 | 3 |
| 2530 — LLID #3 | 2 |
| 2533 — Queue Length #3 | 3 |
| 2535 — LLID #4 | 2 |
| 2537 — Queue Length #4 | 3 |
| 2540 — LLID #5 | 2 |
| 2543 — Queue Length #5 | 3 |
| 2545 — LLID #6 | 2 |
| 2547 — Queue Length #6 | 3 |
| 2550 — LLID #7 | 2 |
| 2553 — Queue Length #7 | 3 |
| 2555 — Pad | 0-35 |
| 2557 — FCS | 4 |

Report Message
(Non-Standard)
2600

| | Field | Octets |
|---|---|---|
| 2603 | Destination Address | 6 |
| 2605 | Source Address | 6 |
| 2607 | Length/Type = 0x8808 | 2 |
| 2610 | Opcode = 0x0013 | 2 |
| 2613 | Timestamp | 4 |
| 2615 | Multi-Part Report | 1 |
| 2617 | Report Time | 4 |
| 2620 | Granted LLID #1 | 2 |
| 2623 | Queue Length #1 | 3 |
| 2625 | Granted LLID #2 | 2 |
| 2627 | Queue Length #2 | 3 |
| 2630 | Granted LLID #3 | 2 |
| 2633 | Queue Length #3 | 3 |
| 2635 | Granted LLID #4 | 2 |
| 2637 | Queue Length #4 | 3 |
| 2640 | Granted LLID #5 | 2 |
| 2643 | Queue Length #5 | 3 |
| 2645 | Granted LLID #6 | 2 |
| 2647 | Queue Length #6 | 3 |
| 2650 | Granted LLID #7 | 2 |
| 2653 | Queue Length #7 | 3 |
| 2655 | Pad/Reserved | 0 |
| 2657 | FCS | 4 |

Multi-Part Report Field
(Non-Standard)
2700

| Bit | Field | Value |
|---|---|---|
| 0-3 | Number of reports in message (optional) | The number of report messages in this transmission (0-7) |
| 4-7 | Number of report messages remaining | The number of remaining report messages in the ONU |

2705 — (row with bits 0-3)
2710 — (row with bits 4-7)

Sleep Gate Message
(Non-Standard)
2800

| Field | Octets |
|---|---|
| Destination Address | 6 |
| Source Address | 6 |
| Length/Type = 0x8808 | 2 |
| Opcode = 0x0016 | 2 |
| Timestamp | 4 |
| Channel Assignment | 1 |
| Start Time | 4 |
| PLID | 2 |
| Sleep Length (EQ) | 4 |
| Pad/Reserved | 29 |
| FCS | 4 |

2805 — Destination Address
2810 — Source Address
2815 — Length/Type = 0x8808
2820 — Opcode = 0x0016
2825 — Timestamp
2830 — Channel Assignment
2835 — Start Time
2840 — PLID
2845 — Sleep Length (EQ)
2850 — Pad/Reserved
2855 — FCS

DISCOVERY AND REGISTRATION IN MULTI-CHANNEL PASSIVE OPTICAL NETWORKS (PONS)

CROSS-REFERENCE TO RELATED APPLICATIONS

This application claims priority to U.S. provisional patent application No. 62/491,661 filed on Apr. 28, 2017 by Futurewei Technologies, Inc. and titled "Discovery and Registration in Multi-Channel Passive Optical Networks (PONs)," which is incorporated by reference.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A PON is one system for providing network access over the last mile, which is the final portion of a telecommunications network that delivers communication to customers. A PON is a P2MP network comprising an OLT at a CO, ONUs at user premises, and an ODN coupling the OLT to the ONUs. PONs may also comprise RNs located between the OLTs and the ONUs, for instance at the end of roads where multiple customers reside.

NG-PONs may combine TDM and WDM to support higher capacities so that increased numbers of users can be served by a single OLT with sufficient bandwidth per user. In such a TWDM PON, a WDM PON may be overlaid on top of a TDM PON. Thus, different wavelengths may be multiplexed together to share a single feeder fiber, and each wavelength may be shared by multiple users using TDM.

SUMMARY

In one embodiment, the disclosure includes an ONU comprising: a receiver configured to receive a discovery gate message from an OLT, the discovery gate message comprises a channel assignment field, and a discovery information field, the channel assignment field indicates transmission characteristics for a plurality of channels, and the discovery information field indicates a 25G upstream capability and a 25G discovery window; and a processor coupled to the receiver and configured to process the discovery gate message. In some embodiments, the channel assignment field comprises: a first field indicating whether upstream channel 0 may be used for transmission; a second field indicating whether upstream channel 1 may be used for transmission; a third field indicating whether upstream channel 2 may be used for transmission; a fourth field indicating whether upstream channel 3 may be used for transmission; and a fifth field that is reserved; the discovery information field comprises: a first field indicating whether the OLT supports 25 Gb/s reception; and a second field indicating whether the OLT can receive 25 Gb/s data in a window; the discovery information field further indicates: a 50G upstream capability, a 50G discovery window, a 100G upstream capability, and a 100G discovery window; the discovery gate message comprises an opcode field, and wherein the opcode field comprises a value of 0x0017; the discovery gate message further comprises a grant length field; the grant length field comprises: a first field indicating a transmission opportunity duration; a second field indicating the discovery gate message; a third field indicating whether a report frame should be issued for a granted LLID; and a fourth field indicating whether fragmentation is allowed; the discovery gate message further comprises a granted LLID field indicating a broadcast LLID.

In another embodiment, the disclosure includes a method implemented in an OLT, the method comprising: generating a gate message, the gate message is a discovery gate message or a normal gate message, the gate message comprises a destination address field, a source address field, a length/type field, an operation code (opcode) field, a timestamp field, a channel assignment field, a start time field, a grant length field, and a synchronization (sync) time field, the gate message further comprises a discovery information field when the gate message is a discovery gate message, and the channel assignment field indicates transmission characteristics for a plurality of channels corresponding to different wavelengths; and transmitting the gate message to an ONU. In some embodiments, the channel assignment field comprises: a first field indicating whether upstream channel 0 may be used for transmission; a second field indicating whether upstream channel 1 may be used for transmission; a third field indicating whether upstream channel 2 may be used for transmission; a fourth field indicating whether upstream channel 3 may be used for transmission; and a fifth field that is reserved; the grant length field comprises: a first field indicating a transmission opportunity duration; a second field indicating the gate message; a third field indicating whether a report frame should be issued for a granted LLID; and a fourth field indicating whether fragmentation is allowed; the gate message further comprises an opcode field, and wherein the opcode field comprises a value of 0x0017.

In yet another embodiment, the disclosure includes a method implemented in an ONU, the method comprising: generating a register request message, the register request message comprises a destination address field, a source address field, a length/type field, an opcode field, and a discovery information field, and the discovery information field indicates a 25G upstream capability and a 25G registration attempt; and transmitting the register request message to an OLT. In some embodiments, the opcode field comprises a value of 0x0014; the discovery information field further indicates a 50G upstream capability and a 50G registration attempt; the discovery information field further indicates a 100G upstream capability and a 100G registration attempt.

In yet another embodiment, the disclosure includes an OLT comprising: a processor configured to generate a register message, the register message comprises a destination address field, a source address field, a length/type field, an opcode field, a timestamp field, and a default channel configuration field, and the default channel configuration field indicates disablement or enablement of transmitters in an ONU; and a transmitter coupled to the processor and configured to transmit the register message to the ONU. In some embodiments, the default channel configuration field is 1 octet; the default channel configuration field comprises four bits dedicated to downstream channels; the default channel configuration field comprises four bits dedicated to upstream channels.

Any of the above embodiments may be combined with any of the other above embodiments to create a new embodiment. These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 5 is a channel assignment field in a discovery gate message according to an embodiment of the disclosure.

FIG. 6 is a channel assignment field in a discovery gate message according to another embodiment of the disclosure.

FIG. 7 is a discovery grant length (EQ) field in a discovery gate message according to an embodiment of the disclosure.

FIG. 8 is a discovery information field in a discovery gate message according to an embodiment of the disclosure.

FIG. 9 is a discovery information field in a discovery gate message according to another embodiment of the disclosure.

FIG. 10 is a discovery information field in a discovery gate message according to yet another embodiment of the disclosure.

FIG. 11 is a discovery information field in a discovery gate message according to yet another embodiment of the disclosure.

FIG. 13 is a discovery information field in a register request message according to an embodiment of the disclosure.

FIG. 14 is a discovery information field in a register request message according to another embodiment of the disclosure.

FIG. 15 is a discovery information field in a register request message according to yet another embodiment of the disclosure.

FIG. 16 is a discovery information field in a register request message according to yet another embodiment of the disclosure.

FIG. 17 is a discovery information field in a register request message according to yet another embodiment of the disclosure.

FIG. 20 is a default channel configuration in a register message field according to an embodiment of the disclosure.

FIG. 24 is a gate message according to another embodiment of the disclosure.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The following abbreviations and initialisms apply:
ASIC: application-specific integrated circuit
Ch: channel
CO: central office
CPU: central processing unit
DS: downstream
DSP: digital signal processor
EO: electrical-to-optical
EPON: Ethernet PON
EQ: envelope quant(a,um)
FCS: frame check sequence
FPGA: field-programmable gate array
G: gigabits per second
Gb/s: gigabits per second
ID: identifier
IEEE: Institute of Electrical and Electronics Engineers
LLID: logical link ID
MAC: media access control
MLID: management link ID
MPCPDU: Multipoint MAC Control Protocol data unit
NG-PON: next-generation PON
ns: nanosecond(s)
ODN: optical distribution network
OE: optical-to-electrical
OLT: optical line terminal
ONT: optical network terminal
ONU: optical network unit
opcode: operation code
PLID: physical layer ID
PON: passive optical network
P2MP: point-to-multipoint
RAM: random-access memory
RF: radio frequency
RN: remote node
ROM: read-only memory
RX: receiver unit
SRAM: static RAM
sync: synchronization
TCAM: ternary content-addressable memory
TDM: time-division multiplexing TDMA: time-division multiple access
TWDM: time- and wavelength-division multiplexing
TX: transmitter unit
US: upstream
WDM: wavelength-division multiplexing.

Figure 1:
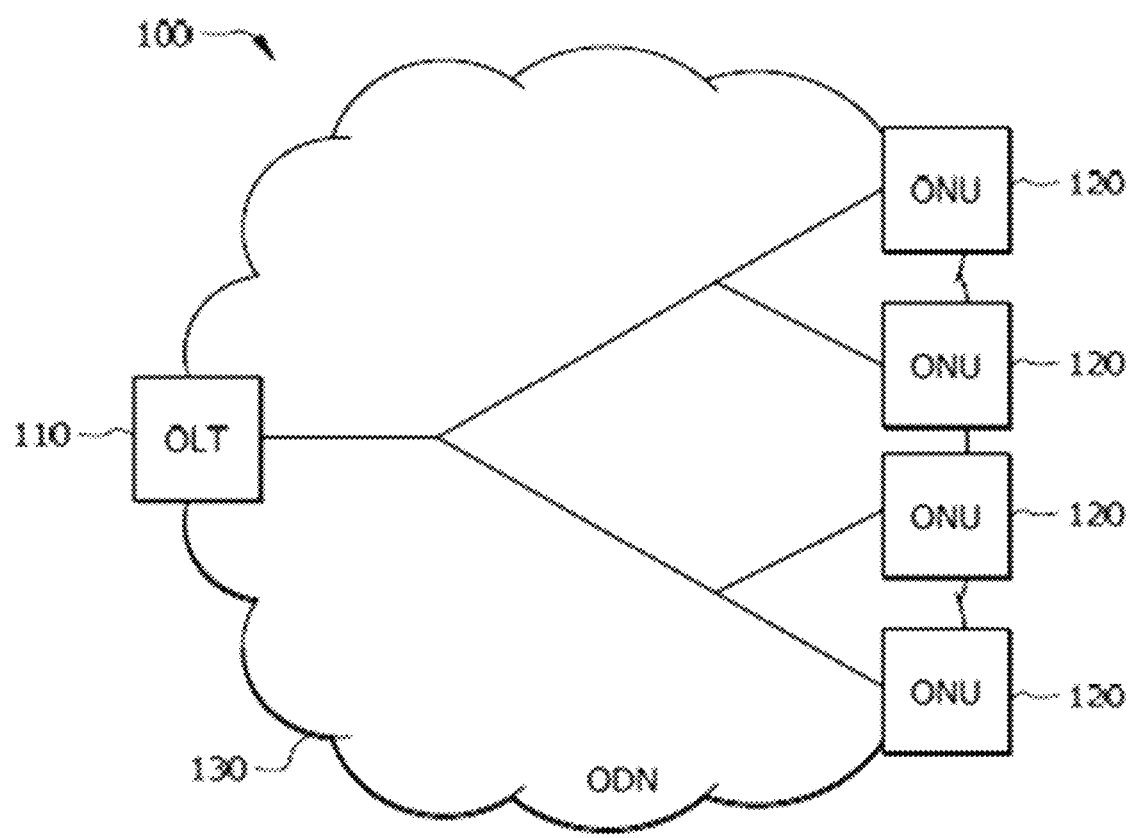
FIG. 1 is a schematic diagram of a PON.

FIG. 1 is a schematic diagram of a PON 100. The PON 100 comprises an OLT 110, ONUs 120, and an ODN 130 that couples the OLT 110 to the ONUs 120. The PON 100 is a communications network that may not require active components to distribute data between the OLT 110 and the ONUs 120. Instead, the PON 100 may use passive optical components in the ODN 130 to distribute data between the OLT 110 and the ONUs 120.

The OLT 110 communicates with another network and with the ONUs 120. Specifically, the OLT 110 is an intermediary between the other network and the ONUs 120. For instance, the OLT 110 forwards data received from the other network to the ONUs 120 and forwards data received from the ONUs 120 to the other network. The OLT 110 comprises a transmitter and a receiver. When the other network uses a network protocol that is different from the protocol used in the PON 100, the OLT 110 comprises a converter that converts the network protocol to the PON protocol and vice versa. The OLT 110 is typically located at a central location such as a CO, but it may also be located at other suitable locations.

The ODN 130 is a data distribution network that comprises optical fiber cables, couplers, splitters, distributors, and other suitable components. The components include passive optical components that do not require power to distribute signals between the OLT 110 and the ONUs 120. Alternatively, the components include active components such as optical amplifiers that do require power. The ODN 130 extends from the OLT 110 to the ONUs 120 in a branching configuration as shown, but the ODN 130 may be configured in any other suitable P2MP configuration.

The ONUs 120 communicate with the OLT 110 and customers and function as intermediaries between the OLT 110 and the customers. To do so, the ONUs 120 comprise optical transceivers that receive optical signals from the OLT 110, convert the optical signals into electrical signals, and provide the electrical signals to the customers. The transceivers also receive electrical signals from the customers, convert the electrical signals into optical signals, and transmit the optical signals to the OLT 110. ONUs 120 and ONTs are similar, and the terms may be used interchangeably. The ONUs 120 are typically located at distributed locations such as customer premises, but they may also be located at other suitable locations.

There is a desire for the PON 100 to provide increased data rates. In response, "Draft Standard for Ethernet Amendment: Physical Layer Specifications and Management Parameters for 25 Gb/s, 50 Gb/s, and 100 Gb/s Passive Optical Networks," IEEE P802.3ca/D0.07, January 2018 ("IEEE 802.3 Draft"), which is incorporated by reference, describes PONs, including EPONs implementing TDMA, that provide data rates of 25 Gb/s, 50 Gb/s, and 100 Gb/s PONs. However, there remains a need to better implement discovery and registration in those PONs.

Disclosed herein are embodiments for discovery and registration in multi-channel PONs. The embodiments comprise messages that implement 25 Gb/s, 50 Gb/s, and 100 Gb/s data rates. The messages comprise discovery gate messages, register request messages, register messages, register acknowledgment messages, gate messages, report messages, and sleep gate messages.

Figure 2:
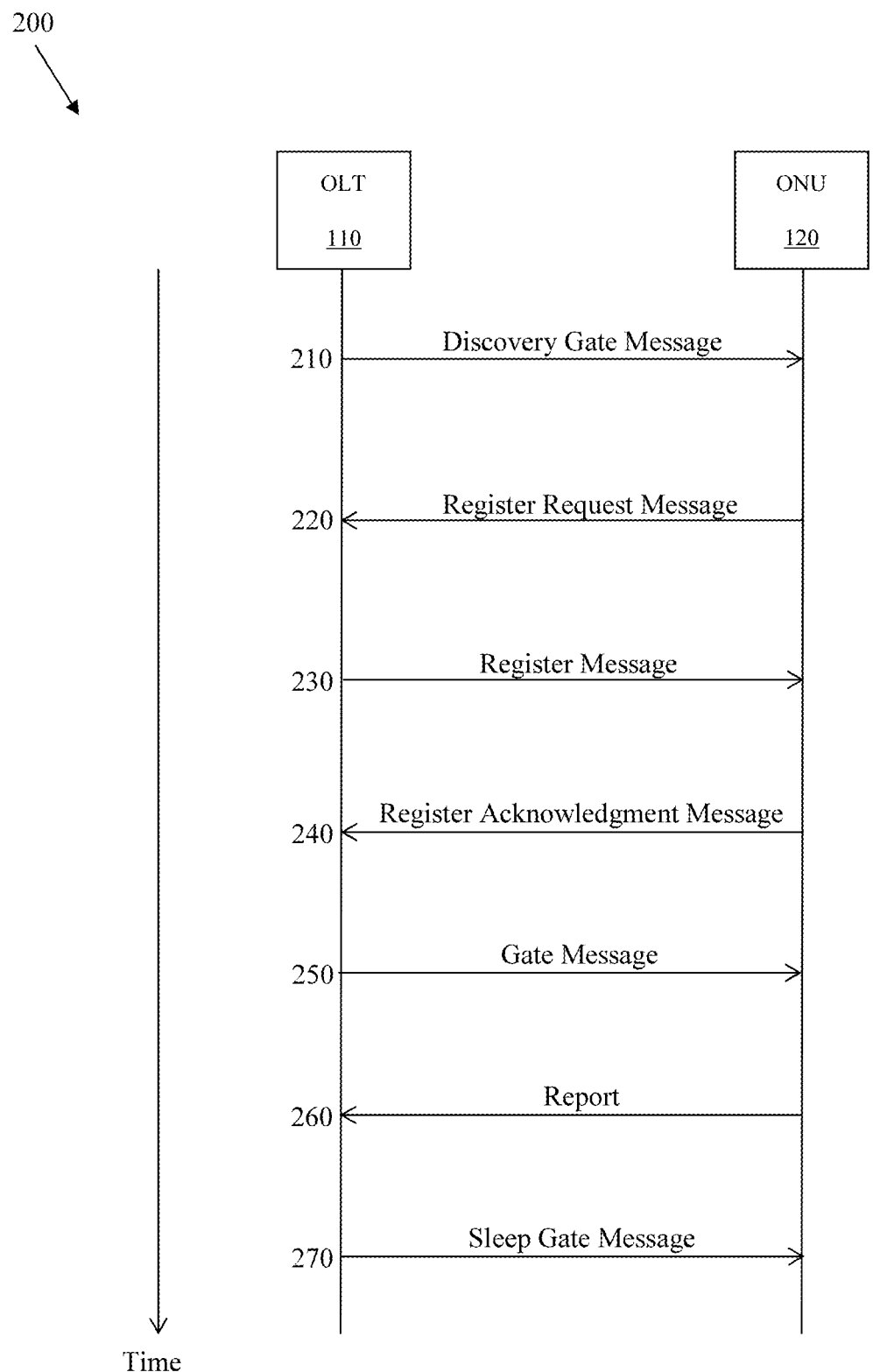
FIG. 2 is a message sequence diagram illustrating discovery and registration of an ONU.

FIG. 2 is a message sequence diagram 200 illustrating discovery and registration of an ONU 120. The message sequence diagram 200 also illustrates reporting and sleep messaging. At step 210, the OLT 110 transmits to the ONUs 120 a discovery gate message granting transmission windows for discovery and indicating capabilities of the OLT 110. At step 220, an ONU 120 transmits to the OLT 110 a register request message requesting registration in the PON 100 and indicating capabilities of the ONU 120. At step 230, the OLT 110 transmits to the ONU 120 a register message instructing the ONU 120 to register and assigning IDs to the ONU 120. At step 240, the ONU 120 transmits to the OLT 110 a register acknowledgment message acknowledging the register message and echoing the IDs. By completing step 240, the ONU 120 completes discovery and registration and enters normal operation.

At step 250, the OLT 110 transmits to the ONU 120 a gate message granting transmission windows for normal transmission. The gate message at step 250 is similar to the discovery gate message at step 210. To contrast with the discovery gate message at step 210, the gate message at step 250 may also be referred to as a normal gate message. At step 260, the ONU 120 transmits to the OLT 110 a report message indicating queue statuses. Finally, at step 270, the OLT 110 transmits to the ONU 120 a sleep gate message informing the ONU 120 that the ONU 120 will not receive any data for an indicated period of time. The discovery gate message in step 210, the register request message in step 220, the register message in step 230, the gate message in step 250, and the report message in step 260 are extended as described below. The sleep gate message in step 270 is introduced as described below.

Figure 3:
FIG. 3 is a discovery gate message according to an embodiment of the disclosure.

FIG. 3 is a discovery gate message 300 according to an embodiment of the disclosure. The discovery gate message 300 is a standard message that implements the discovery gate message in step 210 of FIG. 2. The discovery gate message 300 is similar to the gate message in step 250 of FIG. 2 as described below. The discovery gate message 300 comprises a destination address field 305 of 6 octets, a source address field 310 of 6 octets, a length/type field 315 of 2 octets, an opcode field 320 of 2 octets, a timestamp field 325 of 4 octets, a channel assignment field 330 of 1 octet, a start time field 335 of 4 octets, a discovery grant length (EQ) field 340 of 3 octets, a sync time field 345 of 2 octets, a discovery information field 350 of 2 octets, a pad field 355 of 28 octets, and an FCS field 360 of 4 octets.

The destination address field 305 is a MAC address of a recipient, a port of the recipient, or multiple recipients. In this case, the recipient is the ONU 120 or one of the recipients is the ONU 120. If the MAC address is of multiple recipients, then the MAC address is a MAC multicast address. The source address field 310 is a MAC address of a port transmitting the message. In this case, the port is part of the OLT 110. The length/type field 315 indicates a MAC type field value assigned for Ethertype MAC. The opcode field 320 comprises a value indicating a specific MPCPDU being encapsulated. In this case, the opcode field 320 comprises a value of 0x0017 indicating the discovery gate message 300. The timestamp field 325 indicates a local time register at a time of transmission of the message. The start time field 335 indicates a start time of a grant. In this case, the grant is a discovery grant. The sync time field 345 indicates a required synchronization time of a receiver of the OLT 110. The pad field 355 is an empty field that comprises zeros and is ignored on reception. The FCS field 360 indicates FCS data. The channel assignment field 330, the discovery grant length (EQ) field 340, and the discovery information field 350 are described below.

Figure 4:
FIG. 4 is a discovery gate message according to another embodiment of the disclosure.

FIG. 4 is a discovery gate message 400 according to another embodiment of the disclosure. The discovery gate message 400 is a non-standard message that implements the discovery gate message in step 210 of FIG. 2. The discovery gate message 400 is similar to the discovery gate message 300 in FIG. 3. Specifically, the discovery gate message 400 comprises a destination address field 405 of 6 octets, a source address field 410 of 6 octets, a length/type field 415 of 2 octets, an opcode field 420 of 2 octets, a timestamp field 425 of 4 octets, a channel assignment field 430 of 1 octet, a start time field 435 of 4 octets, a flags/grant length (EQ) field 445 of 3 octets, a sync time field 450 of 2 octets, a discovery information field 455 of 2 octets, a pad/reserved field 460 of 26 octets, and an FCS field 465 of 4 octets, which are similar to the destination address field 305, the source address field 310, the length/type field 315, the opcode field 320, the timestamp field 325, the channel assignment field 330, the start time field 335, the discovery grant length (EQ) field 340, the sync time field 345, the discovery information field 350, the pad field 355, and the FCS field 360, respectively.

However, unlike the discovery gate message 300, which comprises an opcode field 320 with a value of 0x0017, the value of the opcode field 420 is 0x0012. In addition, the discovery gate message 400 further comprises a granted LLID field 440 of 2 octets. The granted LLID field 440 indicates a broadcast LLID. The channel assignment field 430, the flags/grant length (EQ) field 445, and the discovery information field 455 are described below.

FIG. 5 is a channel assignment field 500 in a discovery gate message according to an embodiment of the disclosure. The channel assignment field 500 is a standard field that implements the channel assignment field 330 in FIG. 3 or the channel assignment field 430 in FIG. 4. The channel assignment field 500 comprises a field 505 in bit 0, a field 510 in bit 1, a field 515 in bit 2, a field 520 in bit 3, and a field 525 in bits 4-7. The field 505 is for upstream channel 0, the field 510 is for upstream channel 1, the field 515 is for upstream channel 2, the field 520 is for upstream channel 3, and the field 525 is reserved for future use. The fields 505, 510, 515, 520 carry a 0 value to indicate channel 0, 1, 2, or 3, respectively, may not be used for transmission or carry a 1 value to indicate channel 0, 1, 2, or 3, respectively, may be used for transmission.

FIG. 6 is a channel assignment field 600 in a discovery gate message according to another embodiment of the disclosure. The channel assignment field 600 is an non-standard field that implements the channel assignment field 330 in FIG. 3 or the channel assignment field 430 in FIG. 4. The channel assignment field 600 comprises a field 605 in bit 0, a field 610 in bit 1, a field 615 in bit 2, a field 620 in bit 3, and a field 625 in bits 4-7. The fields 605, 610, 616, 620 indicate grants for channels 0, 1, 2, 3, respectively. The field 625 is ignored on reception. The fields 605, 610, 615, 620 carry a 0 value to indicate a transmission opportunity does not apply to channel 0, 1, 2, or 3, respectively, or carry a 1 value to indicate a transmission opportunity does apply to channel 0, 1, 2, or 3, respectively. Both the channel assignment field 500 in FIG. 5 and the channel assignment field 600 in FIG. 6 indicate transmission characteristics for a plurality of channels.

FIG. 7 is a discovery grant length (EQ) field 700 in a discovery gate message according to an embodiment of the disclosure. Alternatively, FIG. 7 is a flags/grant length (EQ) field. The discovery grant length (EQ) field 700 is a non-standard field that implements the discovery grant length (EQ) field 340 in FIG. 3 or the flags/grant length (EQ) field 445 in FIG. 4. The discovery grant length (EQ) field 700 comprises a grant length field 705 in bits 0-20, a discovery flag field 710 in bit 21, a force report field 715 in bit 22, and a fragment flag field 720 in bit 23.

The grant length field 705 indicates a transmission opportunity duration in EQ for a grant. The discovery flag field 710 carries a 0 value when the discovery grant length (EQ) field 700 is in the gate message in step 250 of FIG. 2 or carries a 1 value when the discovery grant length (EQ) field 700 is in the discovery gate message in step 210 of FIG. 2. The force report field 715 carries a 0 value when no action is required and carries a 1 value when a report frame should be issued for a granted LLID at a corresponding transmission opportunity. The fragment flag field 720 carries a 0 value when creation of a new fragment is disallowed in a grant and carries a 1 value when fragmentation is allowed in the grant. Fragmentation refers to the communication of a single message in different transmission opportunities.

FIG. 8 is a discovery information field 800 in a discovery gate message according to an embodiment of the disclosure. The discovery information field 800 is a standard field that implements the discovery information field 350 in FIG. 3 or the discovery information field 455 in FIG. 4. The discovery information field 800 comprises a field 805 in bit 0, a field 810 in bit 1, a field 815 in bit 2, a field 820 in bits 3-4, a field 825 in bit 5, a field 830 in bit 6, and a field 835 in bits 7-15.

The field 805 is reserved for future use and is ignored on reception. The field 810 indicates whether the OLT 110 is 10G capable, carries a 0 value when the OLT 110 does not support 10 Gb/s reception, and carries a 1 value when the OLT 110 supports 10 Gb/s reception. The field 815 indicates whether the OLT 110 is 25G capable, carries a 0 value when the OLT 110 does not support 25 Gb/s reception, and carries a 1 value when the OLT 110 supports 25 Gb/s reception. The field 820 is reserved for future use and is ignored on reception. The field 825 indicates whether the OLT 110 is opening a 10G discovery window, carries a 0 value when the OLT 110 cannot receive 10 Gb/s data in a window, and carries a 1 value when the OLT 110 can receive 10 Gb/s data in the window. The field 830 indicates whether the OLT 110 is opening a 25G discovery window, carries a 0 value when the OLT 110 cannot receive 25 Gb/s data in a window, and carries a 1 value when the OLT 110 can receive 25 Gb/s data in the window. The field 830 works in conjunction with the channel assignment field 330 in FIG. 3 or the channel assignment field 430 in FIG. 4 so that, if the field 830 carries a value of 1, then then ONU 120 may transmit the register request message 220 in any channel indicated in the channel assignment field 330 or the channel assignment field 430. The field 835 is reserved for future use and is ignored on reception.

FIG. 9 is a discovery information field 900 in a discovery gate message according to another embodiment of the disclosure. The discovery information field 900 is a non-standard field that implements the discovery information field 350 in FIG. 3 or the discovery information field 455 in FIG. 4. The discovery information field 900 comprises a field 905 in bit 0, a field 910 in bit 1, a field 915 in bits 2-3, a field 920 in bit 4, a field 925 in bit 5, a field 930 in bit 6, a field 935 in bit 7, a field 940 in bit 8, a field 945 in bit 9, a field 950 in bit 10, a field 955 in bit 11, a field 960 in bit 12, a field 965 in bit 13, a field 970 in bit 14, and a field 975 in bit 15.

The field 905 indicates whether the OLT 110 is 1G upstream capable, carries a 0 value when the OLT 110 does not support 1 Gb/s reception, and carries a 1 value when the OLT 110 supports 1 Gb/s reception. The field 910 indicates whether the OLT 110 is 10G upstream capable, carries a 0 value when the OLT 110 does not support 10 Gb/s reception, and carries a 1 value when the OLT 110 supports 10 Gb/s reception. The field 915 indicates whether the OLT 110 is 25/50/100G upstream capable, carries a 00 value when the OLT 110 does not support 25/50/100 Gb/s reception, carries a 01 value when the OLT 110 supports 25 Gb/s reception on channel 0, carries a 10 value when the OLT supports 50 Gb/s reception on channels 0 and 1, and carries a 11 value when the OLT 110 supports 100 Gb/s reception on channels 0-3. The field 920 indicates whether the OLT 110 is opening a 1G discovery window, carries a 0 value when the OLT 110 cannot receive 1 Gb/s data in a window, and carries a 1 value when the OLT 110 can receive 1 Gb/s data in the window. The field 925 indicates whether the OLT 110 is opening a 10G discovery window, carries a 0 value when the OLT 110 cannot receive 10 Gb/s data in a window, and carries a 1 value when the OLT 110 can receive 10 Gb/s data in the window. The field 930 indicates whether the OLT 110 is opening a 25/50/100G discovery window, carries a 0 value when no 25/50/100G discovery window is open, and carries a 1 value when the OLT 110 is opening a 25/50/100G discovery window. The field 935 is reserved for future use and is ignored on reception.

The fields 940, 945, 950, 955 carry a 0 value to indicate US channel 0, 1, 2, or 3, respectively, is powered off by default or carry a 1 value to indicate US channel 0, 1, 2, or 3, respectively, is powered on by default. The fields 960, 965, 970, 975 carry a 0 value to indicate DS channel 0, 1, 2, or 3, respectively, is powered off by default or carry a 1 value to indicate DS channel 0, 1, 2, or 3, respectively, is powered on by default. The fields 960, 965, 970, 975 may be optional.

FIG. 10 is a discovery information field 1000 in a discovery gate message according to yet another embodiment of the disclosure. The discovery information field 1000 is a non-standard field that implements the discovery information field 350 in FIG. 3 or the discovery information field 455 in FIG. 4. The discovery information field 1000 is similar to the discovery information field 900 in FIG. 9. Specifically, the discovery information field 1000 comprises fields 1005, 1010, 1015, 1020, 1025, 1030, 1035, which are similar to the fields 905, 910, 915, 920, 925, 930, 935 in the discovery information field 900.

However, unlike the field 930, which is one bit, the field 1030 is two bits and carries a 00 value when the OLT 110 cannot receive 25/50/100G data, a 01 value when the OLT 110 is opening a 25 Gb/s window on channel 0, a 10 value when the OLT 110 is opening a 50 Gb/s window on channels 0 and 1, and a 11 value when the OLT 110 is opening a 100 Gb/s window on channels 0-3. In addition, unlike the field 935, which is one bit, the field 1035 is 8 bits. Furthermore, the discovery information field 1000 does not comprise the fields 940, 945, 950, 955, 960, 965, 970, 975. The field 1030 describes channel behavior, so when the ONU 120 receives the discovery information field 1000 as either the discovery information field 350 in FIG. 3 or the discovery information field 455 in FIG. 4, the ONU 120 may ignore the channel assignment field 330 in FIG. 3 or the channel assignment field 430 in FIG. 4, respectively. Because the field 1030 indicates channels to be used, the ONU 120 may ignore the channel assignment field 330 in FIG. 3 or the channel assignment field 430 in FIG. 4.

FIG. 11 is a discovery information field 1100 in a discovery gate message according to yet another embodiment of the disclosure. The discovery information field 1100 is a non-standard field that implements the discovery information field 350 in FIG. 3 or the discovery information field 455 in FIG. 4. The discovery information field 1100 is similar to the discovery information field 1000 in FIG. 10. Specifically, the discovery information field 1100 comprises fields 1105, 1110, 1120, 1125, 1130, which are similar to the fields 1005, 1010, 1020, 1025, 1035, respectively.

However, unlike the discovery information field 1000, which indicates 25/50/100G upstream capability in a single field 1010, the discovery information field 1100 indicates 25G, 50G, and 100G upstream capability in three fields, the fields 1135, 1140, 1145, respectively. In addition, unlike the discovery information field 1000, which indicates 25/50/100G discovery windows in a single field 1030, the discovery information field 1100 indicates 25G, 50G, and 100G discovery windows in three fields, the fields 1155, 1160, 1165, respectively. Furthermore, the discovery information field 1100 comprises three additional fields 1115, 1150, 1170 that are reserved for future use and ignored on reception. Because the fields 1155, 1160, 1165 indicate 25G, 50G, and 100G discovery windows and therefore indicate use of channel 0, channels 0-1, and channels 0-3, respectively, the ONU 120 may ignore the channel assignment field 330 in FIG. 3 or the channel assignment field 430 in FIG. 4.

Figure 12:
FIG. 12 is a register request message according to an embodiment of the disclosure.

FIG. 12 is a register request message 1200 according to an embodiment of the disclosure. The register request message 1200 is a standard message that implements the register request message in step 220 of FIG. 2. The register request message 1200 comprises a destination address field 1205 of 6 octets, a source address field 1210 of 6 octets, a length/type field 1215 of 2 octets, an opcode field 1220 of 2 octets, a timestamp field 1225 of 4 octets, a flags field 1230 of 1 octet, a pending grants field 1235 of 1 octet, a discovery information field 1240 of two octets, a laser on time field 1245 of 1 octet, a laser off time field 1250 of 1 octet, a pad field 1255 of 34 octets, and an FCS field 1260 of 4 octets.

The destination address field 1205, the source address field 1210, the length/type field 1215, the opcode field 1220, the timestamp field 1225, the pad field 1255, and the FCS field 1260 may be as described above. Unlike other register request messages, the opcode field 1220 has a value of 0x0014 instead of 0x0004. The flags field 1230 indicates special requirements for registration. The discovery information field 1240 is described below. The laser on time field 1245 indicates a time required by the ONU 120 to turn on its laser at the beginning of a transmission. The laser off time field 1250 indicates a time required by the ONU 120 to turn off its laser at the end of a transmission.

FIG. 13 is a discovery information field 1300 in a register request message according to an embodiment of the disclosure. The discovery information field 1300 is a standard field that implements the discovery information field 1240 in FIG. 12. The discovery information field 1300 comprises a field 1305 in bit 0, a field 1310 in bit 1, a field 1315 in bit 2, a field 1320 in bit 3, a field 1325 in bit 4, a field 1330 in bit 5, a field 1335 in bit 6, and a field 1340 in bits 7-15.

The field 1305 indicates whether the ONU 120 is 1G upstream capable, carries a 0 value when the ONU 120 transmitter is not capable of 1 Gb/s, and carries a 1 value when the ONU 120 is capable of 1 Gb/s. The field 1310 indicates whether the ONU 120 is 10G upstream capable, carries a 0 value when the ONU 120 transmitter is not capable of 10 Gb/s, and carries a 1 value when the ONU 120 is capable of 10 Gb/s. The field 1315 indicates whether the ONU 120 is 25G upstream capable, carries a 0 value when the ONU 120 transmitter is not capable of 25 Gb/s, and carries a 1 value when the ONU 120 is capable of 25 Gb/s. The field 1320 is reserved for future use and is ignored on reception. The field 1325 indicates a 1G registration attempt, carries a 0 value when a 1 Gb/s registration is not attempted, and carries a 1 bit when a 1 Gb/s registration is attempted. The field 1330 indicates a 10G registration attempt, carries a 0 value when a 10 Gb/s registration is not attempted, and carries a 1 bit when a 10 Gb/s registration is attempted. The field 1335 indicates a 25G registration attempt, carries a 0 value when a 25 Gb/s registration is not attempted, and carries a 1 bit when a 25 Gb/s registration is attempted. The field 1340 is reserved for future use and is ignored on reception.

FIG. 14 is a discovery information field 1400 in a register request message according to another embodiment of the disclosure. The discovery information field 1400 is a non-standard field that implements the discovery information field 1240 in FIG. 12. The discovery information field 1400 is similar to the discovery information field 1300 in FIG. 13. Specifically, the discovery information field 1400 comprises a field 1405 in bit 0, a field 1410 in bit 1, a field 1415 in bits 2-3, a field 1420 in bit 4, a field 1425 in bit 5, a field 1430 in bits 6-7, and a field 1435 in bits 8-15, which are similar to the fields 1305, 1310, 1315, 1325, 1330, 1335, 1340, respectively.

However, unlike the fields 1315, 1335, the fields 1415, 1430 add 50/100G information. The field 1415 indicates whether the ONU 120 is 25/50/100G upstream capable, carries a 00 value when the ONU 120 transmitter is not capable of 25/50/100 Gb/s, carries a 01 value when the ONU 120 transmitter is capable of 25 Gb/s on channel 0, carries a 10 value when the ONU 120 transmitter is capable of 50 Gb/s on channels 0 and 1, and carries a 11 value when the ONU 120 transmitter is capable of 100 Gb/s on channels 0-3. The field 1430 indicates whether there is a 25/50/100G registration attempt, carries a 00 value when multi-channel registration is not attempted, carries a 01 value when a 25 Gb/s registration is attempted on channel 0, carries a 10 value when a 50 Gb/s registration is attempted on channels 0 and 1, and carries a 11 value when a 100 Gb/s registration is attempted on channels 0-3. In addition, the discovery information field 1400 does not comprise a reserved field between the field 1415 and the field 1420.

FIG. 15 is a discovery information field 1500 in a register request message according to yet another embodiment of the disclosure. The discovery information field 1500 is a non-standard field that implements the discovery information field 1240 in FIG. 12. The discovery information field 1500 is similar to the discovery information field 1300 in FIG. 13. Specifically, the discovery information field 1500 comprises a field 1505 in bit 0, a field 1510 in bit 1, a field 1515 in bits 2-3, a field 1520 in bit 4, a field 1525 in bit 5, a field 1530 in bits 6-7, a field 1535 in bit 8, and a field 1555 in bit 12, which are similar to the fields 1305, 1310, 1320, 1325, 1330, 1340, 1315, 1335, respectively.

However, unlike the discovery information field 1300, the discovery information field 1500 further comprises a field 1540 in bit 9, a field 1545 in bit 10, a field 1550 in bit 11, a field 1560 in bit 13, a field 1565 in bit 14, and a field 1570 in bit 15. The field 1540 indicates whether the ONU 120 is 50G upstream capable, carries a 0 value when the ONU 120 transmitter is not capable of 50 Gb/s, and carries a 1 value when the ONU 120 is capable of 50 Gb/s. The field 1545 indicates whether the ONU 120 is 100G upstream capable, carries a 0 value when the ONU 120 transmitter is not capable of 100 Gb/s, and carries a 1 value when the ONU 120 is capable of 100 Gb/s. The field 1550 is reserved for future use and is ignored on reception. The field 1560 indicates a 50G registration attempt, carries a 0 value when a 50 Gb/s registration is not attempted, and carries a 1 bit when a 50 Gb/s registration is attempted. The field 1565 indicates a 100G registration attempt, carries a 0 value when a 100 Gb/s registration is not attempted, and carries a 1 bit when a 100 Gb/s registration is attempted. The field 1570 is reserved for future use and is ignored on reception.

FIG. 16 is a discovery information field 1600 in a register request message according to yet another embodiment of the disclosure. The discovery information field 1600 is a non-standard field that implements the discovery information field 1240 in FIG. 12. The discovery information field 1600 is similar to the discovery information field 1300 in FIG. 13. Specifically, the discovery information field 1600 comprises a field 1605 in bit 0, a field 1610 in bit 1, a field 1615 in bit 2, a field 1625 in bit 4, a field 1630 in bit 5, a field 1635 in bit 6, and a field 1665 in bit 12, which are similar to the fields 1305, 1310, 1315, 1325, 1330, 1335, 1340, respectively.

However, unlike the discovery information field 1300, the discovery information field 1600 further comprises a field 1620 in bit 3, a field 1640 in bit 7, a field 1645 in bit 8, a field 1650 in bit 9, a field 1655 in bit 10, a field 1660 in bit 11, a field 1670 in bit 13, a field 1675 in bit 14, and a field 1680 in bit 15. The field 1620 indicates whether the ONU 120 is multi-channel upstream capable, carries a 0 value when the ONU 120 transmitter is not capable of multi-channel, and carries a value of 1 when the ONU 120 transmitter is capable of multi-channel. The field 1640 indicates a channel 1 registration attempt, carries a 0 value when registration is not attempted on channel 1, and carries a 1 value when registration is attempted on channel 1. The field 1645 indicates a channel 2 registration attempt, carries a 0 value when registration is not attempted on channel 2, and carries a 1 value when registration is attempted on channel 2. The field 1650 indicates a channel 3 registration attempt, carries a 0 value when registration is not attempted on channel 3, and carries a 1 value when registration is attempted on channel 3.

The field 1655 indicates whether the ONU 120 is channel 1 upstream capable, carries a 0 value when the ONU 120 is not capable of upstream channel 1 transmission, and carries a 1 value when the ONU 120 is capable of upstream channel 1 transmission. The field 1660 indicates whether the ONU 120 is channel 2/3 upstream capable, carries a 0 value when the ONU 120 is not capable of upstream channel 2/3 transmission, and carries a 1 value when the ONU 120 is capable of upstream channel 2/3 transmission. The field 1670 indicates whether the ONU 120 is channel 0 downstream capable, carries a 0 value when the ONU 120 is not capable of downstream channel 0 transmission, and carries a 1 value when the ONU 120 is capable of downstream channel 0 transmission. The field 1675 indicates whether the ONU 120 is channel 1 downstream capable, carries a 0 value when the ONU 120 is not capable of downstream channel 1 transmission, and carries a 1 value when the ONU 120 is capable of downstream channel 1 transmission. The field 1670 indicates whether the ONU 120 is channel 2/3 downstream capable, carries a 0 value when the ONU 120 is not capable of downstream channel 2/3 transmission, and carries a 1 value when the ONU 120 is capable of downstream channel 2/3 transmission.

FIG. 17 is a discovery information field 1700 in a register request message according to yet another embodiment of the disclosure. The discovery information field 1700 is a non-standard field that implements the discovery information field 1240 in FIG. 12. The discovery information field 1700 is similar to the discovery information field 1300 in FIG. 16. Specifically, the discovery information field 1700 comprises a field 1705, a field 1710, a field 1715, a field 1720, a field 1725, a field 1730, a field 1735, a field 1750, a field 1755, a field 1765, a field 1770, and a field 1775, which are similar to the fields 1605, 1610, 1615, 1620, 1625, 1630, 1635, 1675, 1680, 1655, 1660, 1665, respectively. However, unlike the fields 1640, 1645, 1650, which indicate registration attempts using individual channels, the field 1740 indicates a multi-channel registration attempt, carries a 0 value when multi-channel registration is not attempted, and carries a 1 value when multi-channel registration is attempted. In addition, the discovery information field 1700 further comprises the fields 1745, 1760, which are reserved for future use and ignored on reception.

Figure 18:
FIG. 18 is a register message according to an embodiment of the disclosure.

FIG. 18 is a register message 1800 according to an embodiment of the disclosure. The register message 1800 is a standard message that implements the register message in step 230 of FIG. 2. The register message 1800 comprises a destination address field 1805 of 6 octets, a source address field 1810 of 6 octets, a length/type field 1815 of 2 octets, an opcode field 1820 of 2 octets, a timestamp field 1825 of 4 octets, an assigned port (PLID) field 1830 of 2 octets, an assigned port (MLID) field 1835 of 2 octets, a flags field 1840 of 1 octet, a sync time field 1845 of 2 octets, an echo pending grants field 1850 of 1 octet, a laser on time field 1855 of 1 octet, a laser off time field 1860 of 1 octet, a pad field 1865 of 30 octets, and an FCS field 1870 of 4 octets.

The destination address field 1805, the source address field 1810, the length/type field 1815, the opcode field 1820, the timestamp field 1825, the flags field 1840, the sync time field 1845, the laser on time field 1855, the laser off time field 1860, the pad field 1865, and the FCS field 1870 may be as described above. The assigned port (PLID) field 1830 indicates a PLID for the ONU. The assigned port (MLID) field 1835 indicates an MLID for the ONU. The echo pending grants field 1850 indicates a number of future grants the ONU 120 may buffer before activating.

Figure 19:
FIG. 19 is a register message according to another embodiment of the disclosure.

FIG. 19 is a register message 1900 according to another embodiment of the disclosure. The register message 1900 is a non-standard message that implements the register message in step 230 of FIG. 2. The register message 1900 is similar to the register message 1800 in FIG. 18. Specifically, the register message 1900 comprises a destination address field 1905 of 6 octets, a source address field 1910 of 6 octets, a length/type field 1915 of 2 octets, an opcode field 1920 of 2 octets, a timestamp field 1925 of 4 octets, an assigned port (PLID) field 1930 of 2 octets, a flags field 1935 of 1 octet, a sync time field 1940 of 2 octets, an echo pending grants field 1945 of 1 octet, a target laser on time field 1950 of 1 octet, a target laser off time field 1955 of 1 octet, a pad/reserved field 1965 of 31 octets, and an FCS field 1970 of 4 octets, which are similar to the destination address field 1805, the source address field 1810, the length/type field 1815, the opcode field 1820, the timestamp field 1825, the assigned port (PLID) field 1830, the flags field 1840, the sync time field 1845, the echo pending grants field 1850, the laser on time field 1855, the laser off time field 1860, the pad field 1865, and the FCS field 1870, respectively. However, instead of the assigned port (MLID) field 1835, the register message 1900 comprises a default channel configuration field 1960 of 1 octet. The default channel configuration field 1960 is described below.

FIG. 20 is a default channel configuration field 2000 in a register message according to an embodiment of the disclosure. The default channel configuration field 2000 is a non-standard field that implements the default channel configuration field 1960 in FIG. 19. The default channel configuration field 2000 comprises a field 2005 in bit 0, a field 2010 in bit 1, a field 2015 in bit 2, a field 2020 in bit 3, a field 2025 in bit 4, a field 2030 in bit 5, a field 2035 in bit 6, and a field 2040 in bit 7. The fields 2005, 2010, 2015, 2020 indicate whether downstream channel 0, 1, 2, or 3, respectively, is enabled; carry a 0 bit when a channel 0, 1, 2, or 3, respectively, downstream transmitter is disabled; and carry a 1 bit when a channel 0, 1, 2, or 3, respectively, downstream transmitter is enabled. The downstream transmitter may be a transmitter in the OLT 110. The fields 2025, 2030, 2035, 2040 indicate whether upstream channel 0, 1, 2, or 3, respectively, is enabled; carry a 0 bit when a channel 0, 1, 2, or 3, respectively, upstream transmitter is disabled; and carry a 1 bit when a channel 0, 1, 2, or 3, respectively, upstream transmitter is enabled. The upstream transmitter may be a transmitter in the ONU 120. In the default channel configuration field 2000, disabled and enabled indicate default states of the transmitters, and disabled implies a powered-off state of the transmitters. Thus, by transmitting the default channel configuration field 2000 to the ONU 120, the OLT 110 may configure the receivers and the transmitters of the ONU 120.

Figure 21:
FIG. 21 is a register acknowledgment message according to an embodiment of the disclosure.

FIG. 21 is a register acknowledgment message 2100 according to an embodiment of the disclosure. The register acknowledgment message 2100 is a standard message that implements the register acknowledgment message in step 240 of FIG. 2. The register acknowledgment message 2100 comprises a destination address field 2105 of 6 octets, a source address field 2110 of 6 octets, a length/type field 2115 of 2 octets, an opcode field 2120 of 2 octets, a timestamp field 2125 of 4 octets, a flags field 2130 of 1 octet, an echo assigned port (PLID) field 2135 of 2 octets, an echo assigned port (MLID) field 2140 of 2 octets, an echo sync time field 2145 of 2 octets, a pad field 2150 of 33 octets, and an FCS field 2155 of 4 octets.

The destination address field 2105, the source address field 2110, the length/type field 2115, the opcode field 2120, the timestamp field 2125, the flags field 2130, the pad field 2150, and the FCS field 2155 may be as described above. The echo assigned port (PLID) field 2135 indicates the PLID received by the ONU 120 in the assigned port (PLID) field 1830 in FIG. 18 or the assigned port (PLID) field 1930 in FIG. 19. The echo assigned port (MLID) field 2140 indicates the MLID received by the ONU 120 in the assigned port (MLID) field 1835 in FIG. 18. The echo sync time field 2145 indicates a required synchronization time of the OLT 110 as previously advertised. For instance, the required synchronization time is previously advertised in the sync time field 1845 in FIG. 18 or the sync time field 1940 in FIG. 19.

Figure 22:
FIG. 22 is a register acknowledgment message according to another embodiment of the disclosure.

FIG. 22 is a register acknowledgment message 2200 according to another embodiment of the disclosure. The register request message 2200 is a non-standard message that implements the register acknowledgment message in step 240 of FIG. 2. The register acknowledgment message 2200 is similar to the register acknowledgment message 2100 in FIG. 21. Specifically, the register acknowledgment message 2200 comprises a destination address field 2205 of 6 octets, a source address field 2210 of 6 octets, a length/type field 2215 of 2 octets, an opcode field 2220 of 2 octets, a timestamp field 2225 of 4 octets, a flags field 2230 of 1 octet, an echo assigned port (PLID) field 2235 of 2 octets, an echo sync time field 2240 of 2 octets, a pad/reserved field 2250 of 34 octets, and an FCS field 2255 of 4 octets, which are similar to the destination address field 2105, the source address field 2110, the length/type field 2115, the opcode field 2120, the timestamp field 2125, the flags field 2130, the echo assigned port (PLID) field 2135, the echo assigned port (MLID) field 2140, the echo sync time field 2145, the pad field 2150, and the FCS field 2155, respectively. However, instead of the echo assigned port (MLID) field 2140, the register acknowledgment message 2200 comprises an echo default channel configuration field 2245 of 1 octet. The echo default channel configuration field 2245 indicates the value received by the ONU 120 in the default channel configuration field 1960 in FIG. 19.

Figure 23:
FIG. 23 is a gate message according to an embodiment of the disclosure.

FIG. 23 is a gate message 2300 according to an embodiment of the disclosure. The gate message 2300 is a standard message that implements the gate message in step 250 of FIG. 2. The gate message 2300 comprises a destination address field 2303 of 6 octets, a source address field 2305 of 6 octets, a length/type field 2307 of 2 octets, an opcode field 2310 of 2 octets, a timestamp field 2313 of 4 octets, a channel assignment field 2315 of 1 octet, a grant start time field 2317 of 4 octets, an LLID #1 field 2320 of 0 or 2 octets, a grant length #1 field 2323 of 0 or 3 octets, an LLID #2 field 2325 of 0 or 2 octets, a grant length #2 field 2327 of 0 or 3 octets, an LLID #3 field 2330 of 0 or 2 octets, a grant length #3 field 2333 of 0 or 3 octets, an LLID #4 field 2335 of 0 or 2 octets, a grant length #4 field 2337 of 0 or 3 octets, an LLID #5 field 2340 of 0 or 2 octets, a grant length #5 field 2343 of 0 or 3 octets, an LLID #6 field 2345 of 0 or 2 octets, a grant length #6 field 2347 of 0 or 3 octets, an LLID #7 field 2350 of 0 or 2 octets, a grant length #7 field 2353 of 0 or 3 octets, a pad/reserved field 2355 of 0 to 30 octets, and an FCS field 2357 of 4 octets.

The destination address field 2303, the source address field 2305, the length/type field 2307, the opcode field 2310, the timestamp field 2313, the pad/reserved field 2355, and the FCS field 2357 may be as described above. The channel assignment field 2315 may be the same as the channel assignment field 500 in FIG. 5 or the channel assignment field 600 in FIG. 6. The grant start time field 2317 indicates a start time of a grant. In this case, the grant is a grant for normal operation. The LLID fields 2320, 2325, 2330, 2335, 2340, 2345, 2350 indicate LLIDs for each grant. The grant length fields 2323, 2327, 2333, 2337, 2343, 2347, 2354 indicate lengths for each grant. The length may indicate a duration of time in units of EQ. Each of the LLID fields 2320, 2325, 2330, 2335, 2340, 2345, 2350 forms a duple with its succeeding grant length field 2323, 2327, 2333, 2337, 2343, 2347, 2353. Use of each duple is optional. A number of octets in the pad/reserved field 2355 may depend on how many of the duples are used.

FIG. 24 is a gate message 2400 according to another embodiment of the disclosure. The gate message 2400 is a non-standard message that implements the gate message in step 250 of FIG. 2. The gate message 2400 is similar to the gate message 2300 in FIG. 23. Specifically, the gate message 2400 comprises a destination address field 2403 of 6 octets, a source address field 2405 of 6 octets, a length/type field 2407 of 2 octets, an opcode field 2410 of 2 octets, a timestamp field 2413 of 4 octets, a channel assignment field 2415 of 1 octet, a start time field 2417 of 4 octets, a granted LLID #1 field 2420 of 2 octets, a flags/grant length #1 field 2423 of 3 octets, a granted LLID #2 field 2425 of 0 or 2 octets, a flags/grant length #2 field 2427 of 0 or 3 octets, a granted LLID #3 field 2430 of 0 or 2 octets, a flags/grant length #3 field 2433 of 0 or 3 octets, a granted LLID #4 field 2435 of 0 or 2 octets, a flags/grant length #4 field 2437 of 0 or 3 octets, a granted LLID #5 field 2440 of 0 or 2 octets, a flags/grant length #5 field 2443 of 0 or 3 octets, a granted LLID #6 field 2445 of 0 or 2 octets, a flags/grant length #6 field 2447 of 0 or 3 octets, a granted LLID #7 field 2450 of 0 or 2 octets, a flags/grant length #7 field 2453 of 0 or 3 octets, a pad/reserved field 2455 of 0 to 30 octets, and an FCS field 2457 of 4 octets, which are similar to the destination address field 2303, the source address field 2305, the length/type field 2307, the opcode field 2310, the timestamp field 2313, the channel assignment field 2315, the grant start time field 2317, the LLID #1 field 2320, the grant length #1 field 2323, the LLID #2 field 2325, the grant length #2 field 2327, the LLID #3 field 2330, the grant length #3 field 2333, the LLID #4 field 2335, the grant length #4 field 2337, the LLID #5 field 2340, the grant length #5 field 2343, the LLID #6 field 2345, the grant length #6 field 2347, the LLID #7 field 2350, the grant length #7 field 2353, the pad/reserved field 2355, and the FCS field 2357, respectively.

However, unlike the LLID #1 field 2320, which is 0 or 2 octets, the granted LLID #1 field 2420 is 2 octets. In addition, unlike the grant length #1 field 2323, which is 0 or 3 octets, the flags/grant length #1 field 2423 is 3 octets. Furthermore, unlike the grant length #1 field 2323, the grant length #2 field 2327, the grant length #3 field 2333, the grant length #4 field 2337, the grant length #5 field 2343, the grant length #6 field 2347, and the grant length #7 field 2353, the flags/grant length #1 field 2423, the flags/grant length #2 field 2427, the flags/grant length #3 field 2433, the flags/grant length #4 field 2437, the flags/grant length #5 field 2443, the flags/grant length #6 field 2447, and the flags/grant length #7 field 2453 may comprise the three one-bit fields 710, 715, 720 in FIG. 7 and 21 bits for a grant length.

Figure 25:
FIG. 25 is a report message according to an embodiment of the disclosure.

FIG. 25 is a report message 2500 according to an embodiment of the disclosure. The report message 2500 is a standard message that implements the report message in step 260 of FIG. 2. The report message 2500 comprises a destination address field 2503 of 6 octets, a source address field 2505 of 6 octets, a length/type field 2507 of 2 octets, an opcode field 2510 of 2 octets, a timestamp field 2513 of 4 octets, a number of non-empty queues field 2515 of 1 octet, a report time field 2517 of 4 octets, an LLID #1 field 2520 of 2 octets, a queue length #1 field 2523 of 3 octets, an LLID #2 field 2525 of 2 octets, a queue length #2 field 2527 of 3 octets, an LLID #3 field 2530 of 2 octets, a queue length #3 field 2533 of 3 octets, an LLID #4 field 2535 of 2 octets, a queue length #4 field 2537 of 3 octets, an LLID #5 field 2540 of 2 octets, a queue length #5 field 2543 of 3 octets, an LLID #6 field 2545 of 2 octets, a queue length #6 field 2547 of 3 octets, an LLID #7 field 2550 of 2 octets, a queue length #7 field 2553 of 3 octets, a pad field 2555 of 0-35 octets, and an FCS field 2557 of 4 octets.

The destination address field 2503, the source address field 2505, the length/type field 2507, the opcode field 2510, the timestamp field 2513, the pad field 2555, and the FCS field 2557 may be as described above. The number of non-empty queues field 2515 indicates a total number of non-empty queues for all LLIDs in the ONU 120. The report time field 2517 indicates a time at which queue information for the fields 2520-2553 was gathered in the ONU 120. The LLID fields 2520, 2525, 2530, 2535, 2540, 2545, 2550 indicate LLIDs for which the queue length fields 2523, 2527, 2533, 2537, 2543, 2547, 2553 apply. The queue length fields 2523, 2527, 2533, 2537, 2543, 2547, 2553 indicate lengths of queues in EQ. Each of the LLID fields 2520, 2525, 2530, 2535, 2540, 2545, 2550 forms a duple with its succeeding queue length field 2523, 2527, 2533, 2537, 2543, 2547, 2553. Use of each duple is optional. A number of octets in the pad field 2555 may depend on how many of the duples are used.

Figure 26:
FIG. 26 is a report message according to another embodiment of the disclosure.

FIG. 26 is a report message 2600 according to another embodiment of the disclosure. The report message 2600 is a non-standard message that implements the report message in step 260 of FIG. 2. The report message 2600 is similar to the report message 2500 in FIG. 25. Specifically, the report message 2600 comprises a destination address field 2603 of 6 octets, a source address field 2605 of 6 octets, a length/type field 2607 of 2 octets, an opcode field 2610 of 2 octets, a timestamp field 2613 of 4 octets, a report time field 2617 of 4 octets, a granted LLID #1 field 2620 of 2 octets, a queue length #1 field 2623 of 3 octets, a granted LLID #2 field 2625 of 2 octets, a queue length #2 field 2627 of 3 octets, a granted LLID #3 field 2630 of 2 octets, a queue length #3 field 2633 of 3 octets, a granted LLID #4 field 2635 of 2 octets, a queue length #4 field 2637 of 3 octets, a granted LLID #5 field 2640 of 2 octets, a queue length #5 field 2643 of 3 octets, a granted LLID #6 field 2645 of 2 octets, a queue length #6 field 2647 of 3 octets, a granted LLID #7 field 2650 of 2 octets, a queue length #7 field 2653 of 3 octets, a pad/reserved field 2655 of 0 octets, and an FCS field 2657 of 4 octets, which are similar to the destination address field 2503, the source address field 2505, the length/type field 2507, the opcode field 2510, the timestamp field 2513, the report time field 2517, the LLID #1 field 2520, the queue length #1 field 2523, the LLID #2 field 2525, the queue length #2 field 2527, the LLID #3 field 2530, the queue length #3 field 2533, the LLID #4 field 2535, the queue length #4 field 2537, the LLID #5 field 2540, the queue length #5 field 2543, the LLID #6 field 2545, the queue length #6 field 2547, the LLID #7 field 2550, the queue length #7 field 2553, the pad field 2555, and the FCS field, respectively. However, instead of the number of non-empty queues field 2515, the report message 2600 comprises a multi-part report field 2615 of 1 octet. The multi-part report field 2615 is described below.

Figure 27:
FIG. 27 is a multi-part report field in a report message according to an embodiment of the disclosure.

FIG. 27 is a multi-part report field 2700 in a report message according to an embodiment of the disclosure. The multi-part report field 2700 is a non-standard field that implements the multi-part report field 2615 in FIG. 26. The multi-part report field 2700 comprises a field 2705 in bits 0-3 and a field 2710 in bits 4-7. The field 2705 indicates a number of reports in a message and is optional. The field 2710 indicates a number of report messages remaining in the ONU 120.

Figure 28:
FIG. 28 is a sleep gate message according to an embodiment of the disclosure.

FIG. 28 is a sleep gate message 2800 according to an embodiment of the disclosure. The sleep gate message 2800 is a non-standard message that implements the sleep gate message in step 270 of FIG. 2. The sleep gate message 2800 indicates the ONU 120 will not receive data for a period of time. The sleep gate message 2800 comprises a destination address field 2805 of 6 octets, a source address field 2810 of 6 octets, a length/type field 2815 of 2 octets, an opcode field 2820 of 2 octets, a timestamp field 2825 of 4 octets, a channel assignment field 2830 of 1 octet, a start time field 2835 of 4 octets, a PLID field 2840 of 2 octets, a sleep length (EQ) field 2845 of 4 octets, a pad/reserved field 2850 of 29 octets, and an FCS field 2855 of 4 octets.

The destination address field 2805, the source address field 2810, the length/type field 2815, the opcode field 2820, the timestamp field 2825, the pad/reserved field 2850, and the FCS field 2855 may be as described above. The channel assignment field 2830 may be the same as the channel assignment field 500 in FIG. 5 or the channel assignment field 600 in FIG. 6. The start time field 2835 indicates a local time for channel receivers of the ONU 120 to enter a low-power state. The PLID field 2840 indicates the PLID of the ONU 120 message 2800 is addressed to. The sleep length (EQ) field 2845 indicates a duration of time in EQ for the channel receivers to remain in the low-power state. An EQ is equivalent to approximately 2.56 ns.

First, if not otherwise indicated, the described messages and fields may be as defined in "IEEE Standard for Ethernet—Section Five," IEEE, 2015, which is incorporated by reference, or may be as defined in IEEE 802.3 Draft. Second, aspects of different messages and fields may be combined in any suitable manner. For instance, a discovery gate message may comprise the fields from the discovery gate message 300 in FIG. 3, as well as the granted LLID field 440 in the discovery gate message 400 in FIG. 4. Third, fields within fields, for instance the field 505 in the channel assignment field 500, may be referred to as sub-fields. Fourth, channels may correspond to wavelengths and may be designated as $\lambda_n$, wherein n is a non-negative integer. Similarly, different channels may correspond to different wavelengths. Fifth, messages may be referred to as frames. Sixth, bit values may be changed in any suitable manner. For instance, for field 505 in FIG. 5, while a value of 0 is described as indicating channel 0 may not be used for transmission and a value of 1 is described as indicating channel 0 may be used for transmission, a value of 0 may indicate channel 0 may be used for transmission and a value of 1 may indicate channel 0 may not be used for transmission.

Figure 29:
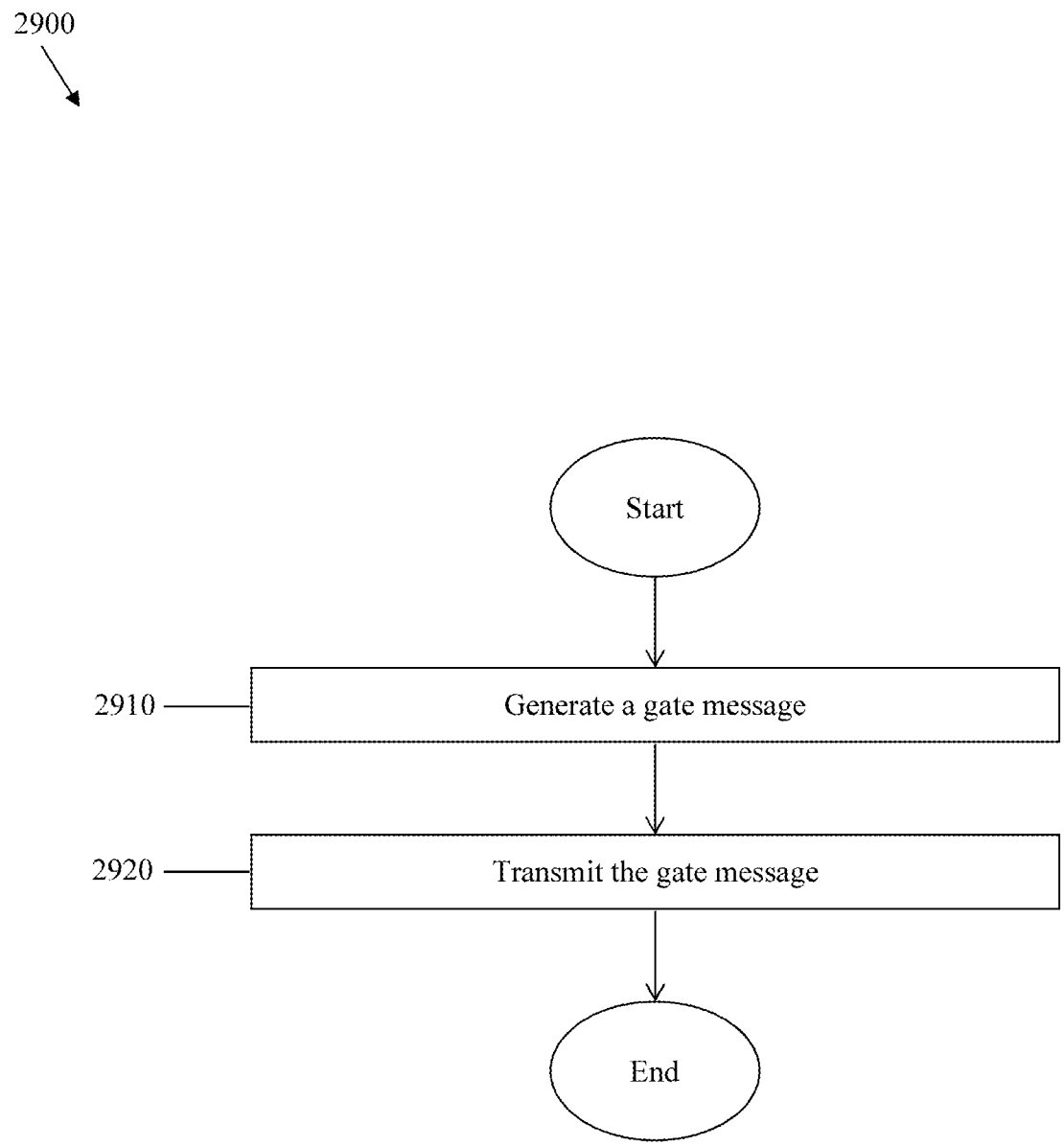
FIG. 29 is a flowchart illustrating a method of generating and transmitting a gate message according to an embodiment of the disclosure.

FIG. 29 is a flowchart illustrating a method 2900 of generating and transmitting a gate message according to an embodiment of the disclosure. An OLT, for instance the OLT 110, implements the method 2900. At step 2910, a gate message is generated. The gate message is a discovery gate message or a normal gate message. The gate message may comprise a destination address field, a source address field, a length/type field, an opcode field, a timestamp field, a channel assignment field, a start time field, a grant length field, and a sync time field. When the gate message is a discovery gate message, the gate message further comprises a discovery information field. The channel assignment field indicates transmission characteristics for a plurality of channels corresponding to different wavelengths. For instance, the OLT 110 generates the discovery gate message 300, the discovery gate message 400, the gate message 2300, or the gate message 2400. Finally, at step 2920, the gate message is transmitted to an ONU. For instance, the OLT 110 transmits the gate message to the ONU 120.

Figure 30:
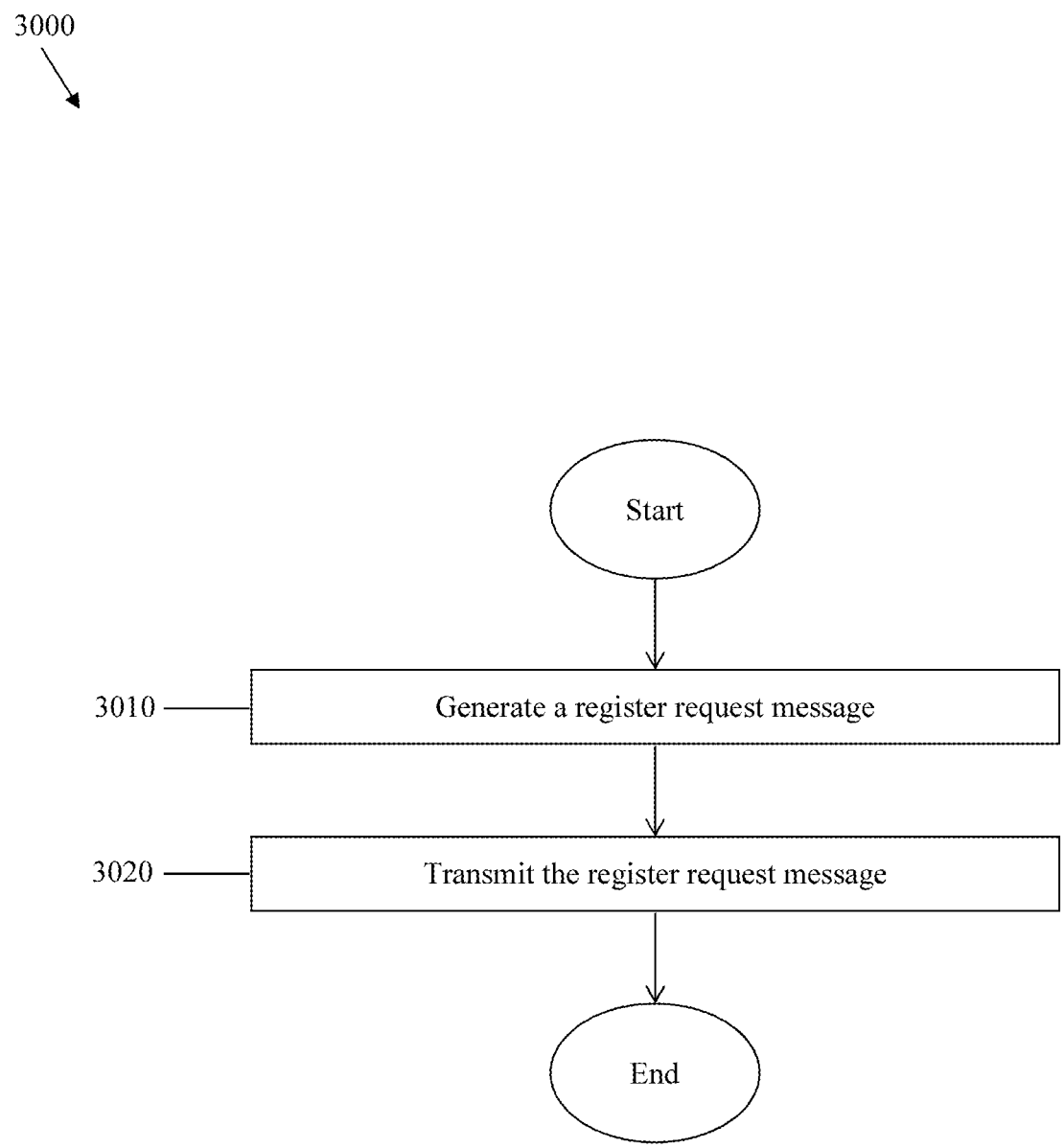
FIG. 30 is a flowchart illustrating a method of generating and transmitting a register request message according to an embodiment of the disclosure.

FIG. 30 is a flowchart illustrating a method 3000 of generating and transmitting a register request message according to an embodiment of the disclosure. An ONU, for instance the ONU 120, implements the method 3000. At step 3010, a register request message is generated. For instance, the ONU 120 generates the register request message 1200. The register request message may comprise a destination address field, a source address field, a length/type field, an opcode field, and a discovery information field. The discovery information field may indicate a 25G upstream capability and a 25G registration attempt. Finally, at step 3020, the register request message is transmitted to an OLT. For instance, the ONU 120 transmits the register request message to the OLT 110.

Figure 31:
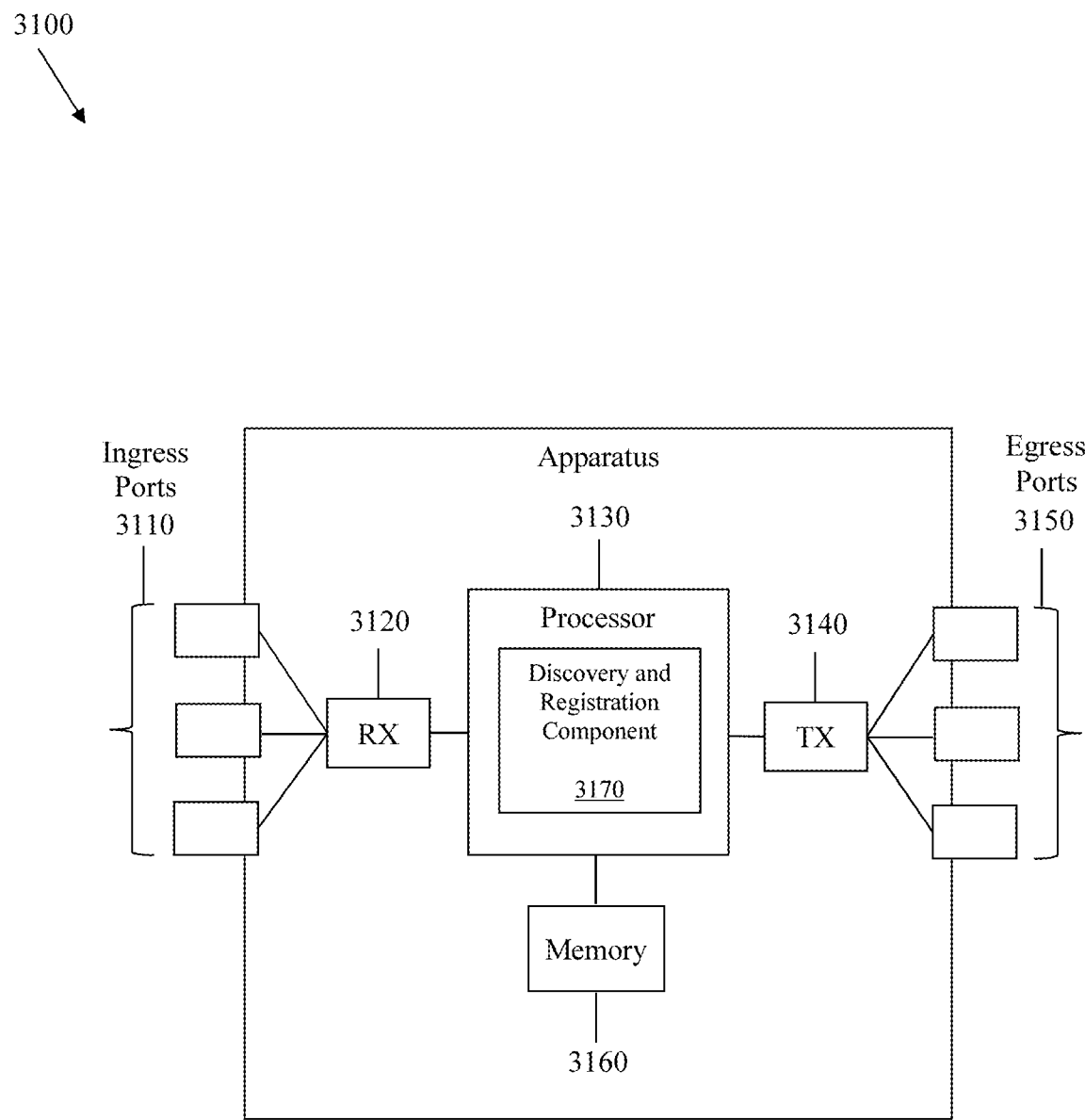
FIG. 31 is a schematic diagram of an apparatus according to an embodiment of the disclosure.

FIG. 31 is a schematic diagram of an apparatus 3100 according to an embodiment of the disclosure. The apparatus 3100 may implement the disclosed embodiments. The apparatus 3100 comprises ingress ports 3110 and an RX 3120 for receiving data; a processor, logic unit, baseband unit, or CPU 3130 to process the data; a TX 3140 and egress ports 3150 for transmitting the data; and a memory 3160 for storing the data. The apparatus 3100 may also comprise OE components, EO components, or RF components coupled to the ingress ports 3110, the RX 3120, the TX 3140, and the egress ports 3150 for ingress or egress of optical, electrical signals, or RF signals.

The processor 3130 is any combination of hardware, middleware, firmware, or software. The processor 3130 comprises any combination of one or more CPU chips, cores, FPGAs, ASICs, or DSPs. The processor 3130 communicates with the ingress ports 3110, the RX 3120, the TX 3140, the egress ports 3150, and the memory 3160. The processor 3130 comprises a discovery and registration component 3170, which implements the disclosed embodiments. The inclusion of the discovery and registration component 3170 therefore provides a substantial improvement to the functionality of the apparatus 3100 and effects a transformation of the apparatus 3100 to a different state. Alternatively, the memory 3160 stores the discovery and registration component 3170 as instructions, and the processor 3130 executes those instructions.

The memory 3160 comprises any combination of disks, tape drives, or solid-state drives. The apparatus 3100 may use the memory 3160 as an over-flow data storage device to store programs when the apparatus 3100 selects those programs for execution and to store instructions and data that the apparatus 3100 reads during execution of those programs. The memory 3160 may be volatile or non-volatile and may be any combination of ROM, RAM, TCAM, or SRAM.

In an example embodiment, an ONU comprises: a receiver element configured to receive a discovery gate message from an OLT, the discovery gate message comprises a channel assignment field, and a discovery information field, the channel assignment field indicates transmission characteristics for a plurality of channels, and the discovery information field indicates a 25G upstream capability and a 25G discovery window; and a processor element coupled to the receiver element and configured to process the discovery gate message.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other items shown or discussed as coupled may be directly coupled or communicating with each other or may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An optical network unit (ONU) comprising:
a receiver configured to receive a discovery message from an optical line terminal (OLT); and
a processor coupled to the receiver and configured to process the discovery message, the discovery message comprises a channel field, an operation code (Opcode) field, and a discovery information field, the channel field indicates transmission characteristics for a plurality of channels, the Opcode field comprises a value of 0x0017, and the discovery information field indicates a 25 gigabits per second (G) upstream capability and a 25G discovery window.

2. The ONU of claim 1, wherein the channel field comprises:
a first field indicating upstream channel 0 may be used for transmission when the first field comprises a logic one value;
a second field indicating upstream channel 1 may be used for transmission when the second field comprises a logic one value; and
a third field that is reserved.

3. The ONU of claim 1, wherein the discovery information field comprises:
a first field indicating the OLT supports 25 gigabits per second (Gb/s) reception when the first field comprises a logic one value; and
a second field indicating the OLT can receive 25 Gb/s data in a window when the second field comprises a logic one value.

4. The ONU of claim 1, wherein the discovery information field further indicates a 10G upstream capability when a first field of the discovery information field comprises a logic one value and indicates a 10G discovery window can receive data when a second field of the discovery information field comprises a logic one value.

5. The ONU of claim 1, wherein the discovery message further comprises a grant length field.

6. The ONU of claim 5, wherein the grant length field comprises:
a first field indicating a transmission opportunity duration;
a second field indicating the discovery message;
a third field indicating a report frame should be issued for a granted logical link identifier (LLID) when the third field comprises a logic one value; and
a fourth field indicating fragmentation is allowed when the fourth field comprises a logic one value.

7. The ONU of claim 1, wherein the discovery message further comprises a granted logical link identifier (LLID) field indicating a broadcast LLID.

8. A method implemented in an optical line terminal (OLT), the method comprising:
generating a gate message, the gate message is a normal gate message, the gate message comprises a destination address field, a source address field, a length/type field, an operation code (Opcode) field, a timestamp field, a channel field, and a length field, the channel field indicates transmission characteristics for a plurality of channels corresponding to different wavelengths, and the channel field comprises a first field indicating upstream channel 0 may be used for transmission when the first field comprises a logic one value, a second field indicating upstream channel 1 may be used for transmission when the second field comprises a logic one value, and a third field that is reserved; and
transmitting the gate message to an optical network unit (ONU).

9. The method of claim 8, wherein the length field comprises:
a first field indicating a transmission opportunity duration;
a second field indicating the gate message;
a third field indicating a report frame should be issued for a granted logical link identifier (LLID) when the third field comprises a logic one value; and
a fourth field indicating fragmentation is allowed when the fourth field comprises a logic one value.

10. The method of claim 8, wherein the Opcode field comprises a value of 0x0012.

11. A method implemented in an optical network unit (ONU), the method comprising:
generating a register request message, the register request message comprises a destination address field, a source address field, a length/type field, an operation code (Opcode) field, and an information field, and the information field comprises a first field that indicates a 10 gigabits per second (G) upstream capability, a second field that is after the first field and indicates only a 25G upstream capability, a third field that is after the second field and is reserved and ignored on reception, a fourth field that is after the third field and indicates a 10G registration attempt, a fifth field that is after the fourth field and indicates only a 25G registration attempt, and a sixth field that is after the fifth field and is reserved and ignored on reception; and
transmitting the register request message to an optical line terminal (OLT).

12. The method of claim 11, wherein the Opcode field comprises a value of 0x0014.

13. The method of claim 11, wherein the information field further indicates a 50G upstream capability and a 50G registration attempt.

14. The method of claim 11, wherein the information field further indicates a 100G upstream capability and a 100G registration attempt.

15. An optical line terminal (OLT) comprising:
a plurality of downstream transmitters; and
a processor coupled to the downstream transmitters and configured to generate a register message, the register message comprises a destination address field, a source address field, a length/type field, an operation code (opcode) field, a timestamp field, and a default channel configuration field, and the default channel configuration field indicates disablement or enablement of upstream transmitters in an optical network unit (ONU) and indicates disablement or enablement of the downstream transmitters,
the downstream transmitters being configured to transmit the register message to the ONU.

16. The OLT of claim 15, wherein the default channel configuration field is 1 octet.

17. The OLT of claim 15, wherein the default channel configuration field comprises four bits dedicated to downstream channels.

18. The OLT of claim 15, wherein the default channel configuration field comprises four bits dedicated to upstream channels.

19. The ONU of claim 1, wherein the channel field comprises:
a first field indicating upstream channel 0 may be used for transmission when the first field comprises a logic one value;
a second field indicating upstream channel 1 may be used for transmission when the second field comprises a logic one value; and
at least one additional field that is extended to indicate an additional upstream channel may be used for transmission when the at least one additional field comprises a logic one value.

20. The method of claim 8, wherein the third field is extended to indicate an additional upstream channel may be used for transmission when the third field comprises a logic one value.

* * * * *

UNITED STATES PATENT AND TRADEMARK OFFICE
CERTIFICATE OF CORRECTION

PATENT NO.      : 10,686,524 B2           Page 1 of 1
APPLICATION NO. : 15/960758
DATED           : June 16, 2020
INVENTOR(S)     : Bo Gao et al.

It is certified that error appears in the above-identified patent and that said Letters Patent is hereby corrected as shown below:

On the Title Page

Page 2, item (56) Second column, Lines 34-36, should read:
"IEEE Standard for Ethernet Section 5," IEEE Std 802.3-2015 (Revision of IEEE Std 802.3-2012), IEEE Standard, XP055677619, Mar. 4, 2016, 74 pages.

Signed and Sealed this
Fourth Day of August, 2020

Andrei Iancu
*Director of the United States Patent and Trademark Office*